United States Patent
Rosenberg

(10) Patent No.: US 9,049,546 B2
(45) Date of Patent: *Jun. 2, 2015

(54) USER DESCRIPTION BASED ON A CONTEXT OF TRAVEL

(75) Inventor: David Rosenberg, New York, NY (US)

(73) Assignee: YELLOWPAGES.COM LLC, Glendale, CA (US)

( * ) Notice: Subject to any disclaimer, the term of this patent is extended or adjusted under 35 U.S.C. 154(b) by 374 days.

This patent is subject to a terminal disclaimer.

(21) Appl. No.: 13/563,784

(22) Filed: Aug. 1, 2012

(65) Prior Publication Data

US 2013/0267252 A1    Oct. 10, 2013

Related U.S. Application Data

(63) Continuation-in-part of application No. 13/488,608, filed on Jun. 5, 2012, now Pat. No. 8,849,312.

(60) Provisional application No. 61/622,131, filed on Apr. 10, 2012.

(51) Int. Cl.
| | |
|---|---|
| *H04W 24/00* | (2009.01) |
| *H04W 4/02* | (2009.01) |
| *H04L 29/08* | (2006.01) |
| *H04W 64/00* | (2009.01) |
| *G01S 19/14* | (2010.01) |

(52) U.S. Cl.
CPC .............. *H04W 4/02* (2013.01); *H04L 67/22* (2013.01); *H04L 67/18* (2013.01); *H04W 64/00* (2013.01); *G01S 19/14* (2013.01)

(58) Field of Classification Search
USPC .......................... 455/456.1–457, 414.1–414.3
See application file for complete search history.

(56) References Cited

U.S. PATENT DOCUMENTS

| | | | | |
|---|---|---|---|---|
| 8,180,369 | B1* | 5/2012 | Sheikh ...................... | 455/456.1 |
| 8,849,312 | B2* | 9/2014 | Rosenberg ................. | 455/456.3 |
| 8,862,173 | B2* | 10/2014 | Marocchi et al. ............ | 455/519 |
| 2008/0039113 | A1* | 2/2008 | Liu et al. .................... | 455/456.1 |
| 2009/0209271 | A1* | 8/2009 | Reed et al. ................. | 455/456.6 |
| 2012/0036016 | A1* | 2/2012 | Hoffberg et al. ........... | 705/14.58 |
| 2014/0141796 | A1* | 5/2014 | Marti et al. ................ | 455/456.1 |

OTHER PUBLICATIONS

Chaoming Song, et al.: "Limits of Predictability in Human Mobility," Science 327, 1018 (2010), www.sciencemag.org.

* cited by examiner

*Primary Examiner* — Sharad Rampuria
(74) *Attorney, Agent, or Firm* — Kilpatrick Townsend & Stockton LLP

(57) ABSTRACT

A description of a user is estimated based on the context of the user's travel pattern. A disclosed data-processing system continually receives data points originating from the user's cell phone, for example, wherein each data point represents a visit by the user to a particular geolocation, at a particular time. The system then partitions the received data points into groups, wherein the groups represent the different places that the user has visited. The system counts how many data points are in each group. Based on the number of data points in each group, as well as the number of groups, the system then determines the entropy of the received data points that correspond to the particular user, which is also regarded as the entropy of the user's travel pattern. The data-processing system then estimates a user description for the user, based at least in part on the determined user entropy.

20 Claims, 17 Drawing Sheets

USER DESCRIPTION BASED ON A CONTEXT OF TRAVEL

CROSS REFERENCE TO RELATED APPLICATIONS

This application is a continuation-in-part of U.S. patent application Ser. No. 13/488,608, filed on 5 Jun. 2012, which, in turn, claims the benefit of U.S. Provisional Patent Application No. 61/622,131, filed on 10 Apr. 2012. These applications are incorporated herein by reference.

If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to sensor analytics in general, and, more particularly, to describing a user based on one or more contexts of location and time.

BACKGROUND OF THE INVENTION

Global positioning system (GPS) and other position determining systems are enabled in a wide variety of devices, including mobile phones, taxis, personal navigation devices, and automobiles. The proliferation of such enabled devices has resulted in an enormous amount of historic and real-time data being generated. The type of data generated typically consists of a latitude, a longitude, a unique identifier and, in some cases, metadata.

The assessed location, or "geolocation," provided by the position determining systems can be used to deliver location-based services to a user. For example, location-based media (LBM) systems deliver multimedia directly to the user of a mobile device dependent upon the device's assessed location. Media sequences can be delivered to, or triggered within, portable wireless devices that are location-enabled (location-aware) and have the capacity to display audiovisual content. Such content is managed and organized externally to the device. The mobile device then downloads formatted content with location-coordinated triggers applied to each media sequence. As the location-aware device enters a geographic area or region, the media sequence assigned to that area is triggered. The assigned media can be designed to be of optimal relevance to the user in the context of the user's immediate surroundings.

FIG. 1 depicts geographic view 100 in the prior art and illustrates an example of the delivery of a location-based service. View 100 comprises geographic areas 102, 104, 106, and 108. Area 102 corresponds to the area occupied by a city's train station. Areas 104 through 108 correspond to various areas surrounding the train station. Persons 112, 114, 116, and 118 are examples of different people presently within the train station area, who are carrying mobile devices. The locations of persons 112 through 118 are known through position determining equipment (PDE) that determines the geolocation of the mobile device carried by each person.

By knowing the geolocation coordinates of each person 112 through 118 and by knowing the boundary coordinates of areas 102 through 108, a system of the prior art is able to infer that the four people are presently at the train station. As a result, location-based services can be provided to all of the people depicted, within the context of the people being presently at the train station.

SUMMARY OF THE INVENTION

The present geolocation of a person can be helpful in understanding the person. Such static information, however, does not provide a unique description of that person. For example, although four people might be presently at the same train station, it is impossible to determine solely from their current geolocation that i) the first person is an urban college student who is going to class, ii) the second is a business traveler who is traveling from one city to the next, iii) the third is a transit employee working at the train station, and iv) the fourth is a mother who is traveling to her home a few short stops away, from a day at the museum with her children. Consequently, it might be inappropriate to deliver the same location-based services to all four people while only accounting for their present assessed location.

The present invention enables a description of a user to be estimated based on the context of the user's travel pattern. This is in contrast to at least some techniques in the prior art, which only account for the context of the present location and at the present moment in time, as is the case of the four people in the aforementioned example.

In accordance with an illustrative embodiment of the present invention, a data-processing system continually receives data points that represent events in the form of user visits, wherein each data point represents a visit by a user to a determinable geolocation, at a determinable time. For example, position determining equipment (PDE) is used to determine a latitude/longitude and a time stamp corresponding to each visit, and to assign these data to each raw data point received from the user's cell phone.

The data-processing system of the illustrative embodiment then partitions the received data points into groups, wherein the groups represent the different places that the user has visited throughout a geographic area of interest. The visited places correspond, for example, to grid cells that are applied to the geographic area. The data-processing system counts how many data points are in each group. Based on the number of data points in each group, as well as the number of groups, the data-processing system then determines the entropy of the received data points that correspond to the particular user.

In the general information-theory sense, entropy is a measure of the uncertainty associated with a random variable. Similarly, and in the context of the illustrative embodiment, the entropy of a user is a measure of how evenly the user visits different places. This user entropy is, in essence, a measure of the user's travel pattern and predictability. In accordance with the illustrative embodiment, user entropy is determined for a particular time segment or segments of interest (e.g., morning, afternoon, evening, weekday, weekend, etc.), which are referred to as "dayparts" in this specification. Additionally, user entropy can be determined based on different grid cell sizes and different geographic areas of interest.

In accordance with the illustrative embodiment, the data-processing system estimates a user description for the user, based at least in part on the determined entropy of the user's travel pattern. In some embodiments of the present invention, the data-processing system transmits a signal that indicates an action to be performed, wherein the action to be performed is based on the determined user entropy.

The overall information acquired about a user, comprising one or more contexts such as travel pattern, becomes part of the user's description. Each user description can be made unique in relation to other users' descriptions, given a sufficient number of data points being evaluated and a sufficient set of characteristics, including user entropy, being considered as part of the estimated description. By estimating a unique description for each user, the system disclosed herein is able to distinguish, for example, i) the aforementioned student who is going to class, from ii) the business traveler in transit, from iii) the transit employee working at the train station, from iv) the mother who is returning home. In doing so, and by accounting for more than just the present assessed location of each user, the disclosed system is able to provide services that are customizable to each user, based on each user's unique description. For example, based on the user descriptions produced by the disclosed system, a media delivery service is able to deliver i) a first customized advertisement to a first user and ii) a second customized advertisement concurrently to a second user who is standing next to the first user.

An illustrative embodiment of the present invention comprises: receiving, by a data-processing system, a plurality of data points D that correspond to a first user, wherein each of the data points in the plurality represents a visit by the first user, the visit occurring at least one of i) a determinable geolocation and ii) a determinable time, and wherein the plurality of data points comprises at least a first data point that occurs at a first time $t_1$, $d(t_1)$; determining an entropy of the plurality of data points D, based on the number of predetermined places to which the data points in the plurality correspond; and estimating a description of the first user, wherein the description is based on the determined entropy.

DETAILED DESCRIPTION

Figure 1:
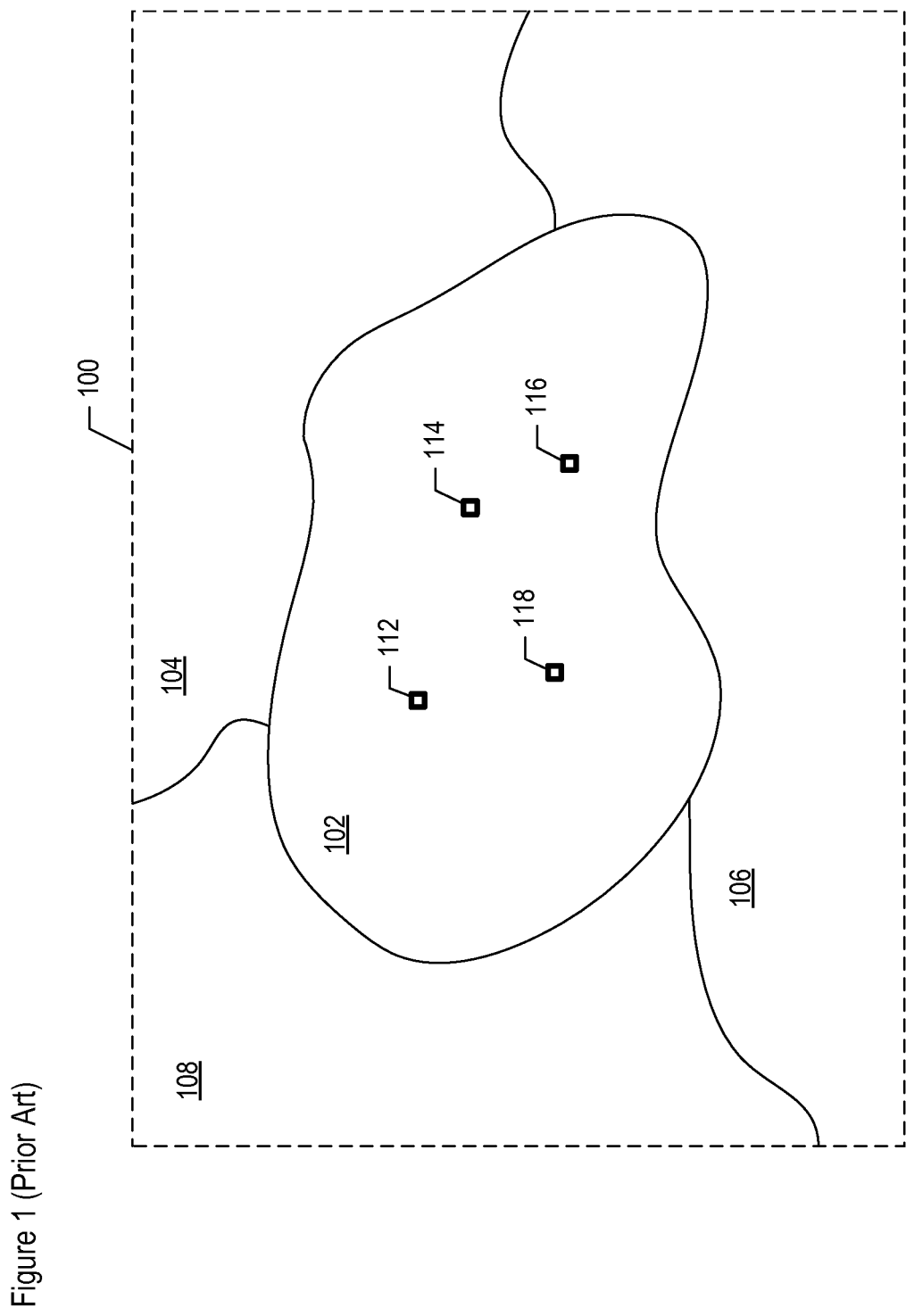
FIG. 1 depicts geographic view 100 in the prior art.

The following terms are defined for use in this Specification, including the appended claims:

The term "location," and its inflected forms, is defined as a zero-dimensional point, a one-dimensional line, a two-dimensional area, or a three-dimensional volume. For example, a location $l_i$ can be a geographic point of interest $p_i$ or a geographic area $a_i$.

The term "spatial-temporal (S-T) event," or "event," and its inflected forms, is defined as any activity or occurrence that can be identified by the location and/or time at which it occurs. For example and without limitation, a spatial-temporal event can represent the arrival or departure of a person(s), animal(s), or product(s) to and/or from a specific geographic location such as, but not limited to, a place of employment, a transit terminal, a food store, a landmark, a shopping center, a hospital, a residence, a street, town, city, state, country, or any location determined by a global positioning system (GPS)-enabled device or assessed by other position determining equipment.

The term "spatial-temporal (S-T) data point," or "data point," and its inflected forms, is defined as data or other information that identifies a specific event, user, or device at a specific location and/or time. For example and without limitation, a spatial-temporal data point can include: a time stamp along with a corresponding geographic location, such as, the time at a latitude and longitude; a time stamp along with an indicium of a specific event at a fixed geographic location, such as the time of a special or sale at a store or entertainment venue; measurement uncertainty information, such as the accuracy of the position determination; the occurrence of an event or action at a particular time and location, such as a taxi being full in the warehouse district at 2:00 am, texting occurring, tweeting occurring, etc.; details about a user communication, such as a Short Message Service (SMS) text having been sent; or other supplemental information. Data points originate from various data sources that include, while not being limited to, a location enabled device such as a cellular telephone, a GPS enabled device, a networked device, a WiFi enabled device, a radio-frequency identification (RFID)-enabled device, and an automated teller machine (ATM) machine. A data point can represent a visit by a user to a determinable geolocation or at a determinable time, or both, wherein the geolocation and/or time can be determined from the contents of the data point or through other means.

The term "unique identifier," and its inflected forms, is defined as any information that identifies a particular person, device, object, event or place at a particular time, occurrence or location. A unique identifier can be that of a location enabled device such as a cellular telephone, a GPS enabled device, a networked device, a WiFi enabled device, a radio-frequency identification (RFID)-enabled device, an automated teller machine (ATM) machine, or any other device that identifies a spatial-temporal data point. A unique identifier can also include a place or event that identifies a spatial-temporal data point associated with that place or event.

The term "individualized data point," and its inflected forms, is defined as a spatial-temporal data point that is identified with a unique identifier. An identifier is considered unique if it is the only one of its kind within a defined address space, such as that of a telecommunications system or network.

The term "daypart," and its inflected forms, is defined as a time segment by which a larger time period has been divided. For example and without limitation, the time period of a day can be divided into a daytime daypart, an evening daypart, and a late night daypart; the time period of a day can be divided into dayparts 1-5, as defined by Arbitron; the time period of a week can be divided into a weekday day daypart, weekday night daypart, weekend day daypart, and weekend night daypart; and the time period of a week can be divided into weekhours 0-167, defined by day of the week and hour of the day.

Figure 2:
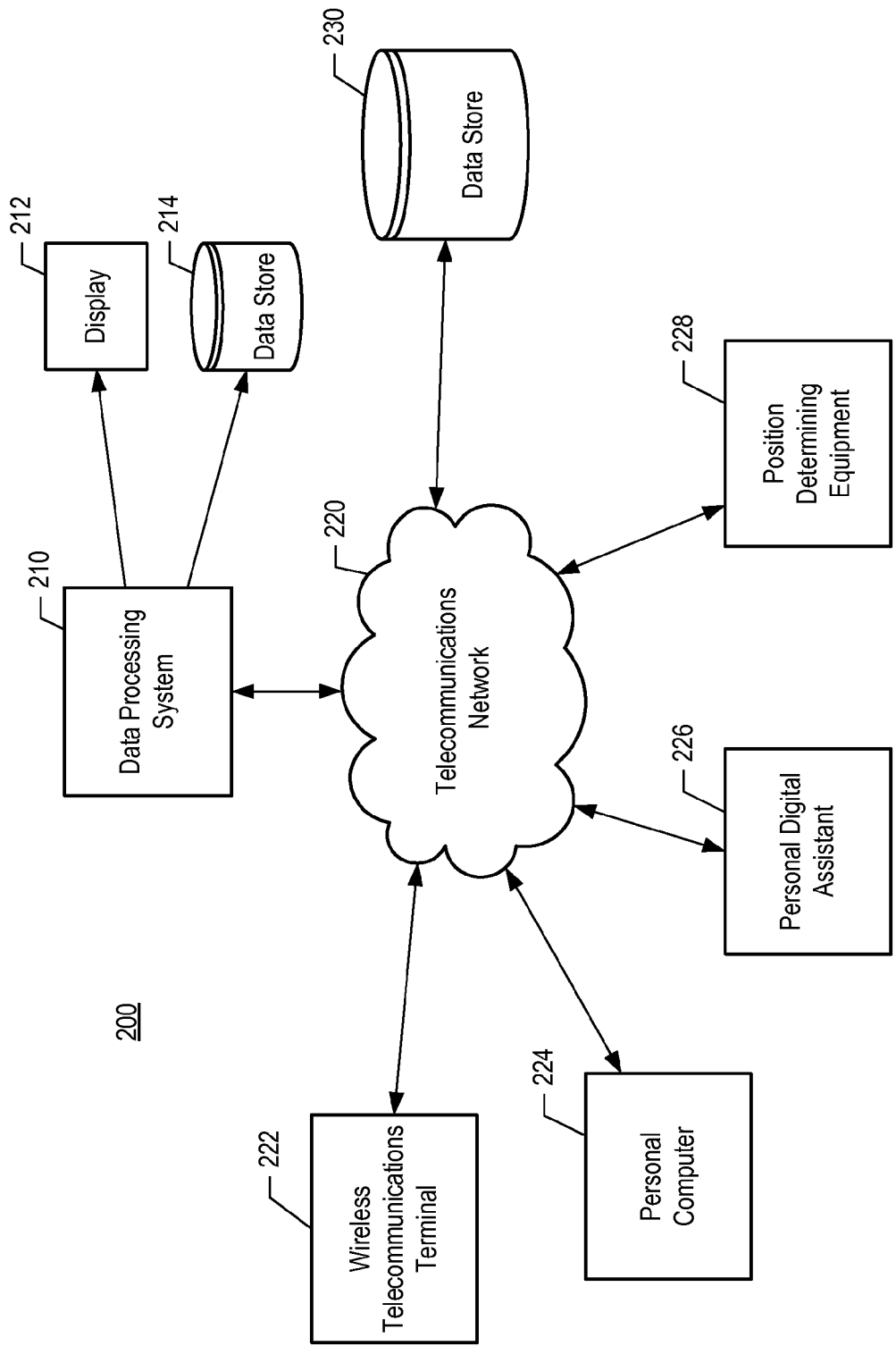
FIG. 2 depicts a block diagram of the salient components of sensor analytics system 200, in accordance with an illustrative embodiment of the present invention.

FIG. 2 depicts a block diagram of the salient components of sensor analytics system 200, in accordance with an illustrative embodiment of the present invention. FIG. 2 depicts data-processing system 210; display 212; data store 214; and telecommunications network 220. Also depicted are: wireless telecommunications terminal 222; personal computer 224; personal digital assistant (PDA) 226; position determining equipment (PDE) 228; and data store 230. The components depicted in FIG. 2 are interconnected as shown.

As those who are skilled in the art will appreciate, after reading this disclosure, sensor analytics system 200 can comprise additional components that also provide sources and repositories of data, in some embodiments. Furthermore, in addition to the components depicted in FIG. 2, sensor analytics system 200 can also be connected to external components that provide additional sources and repositories of data, in some embodiments.

Data-processing system 210 is a computer that comprises non-transitory memory, processing component(s), and communication component(s), as described in more detail in FIG. 2. Data-processing system 210 executes and coordinates the salient tasks of sensor analytics system 200 according to an illustrative embodiment of the present invention. For example, data-processing system 210 receives, via network 220, spatial and/or temporal data from one or more of the data sources, as described in detail below. Data-processing system 210 then analyzes the received data as described below and with respect to the tasks depicted in FIGS. 4 through 14. System 210 is able to send the results of the analysis to user devices (e.g., terminal 222, computer 224, PDE 226, etc.) for presentation, export the results to display 212 separate from the user devices, and/or store the results in data store 214 or 230. Although depicted as a component that is separate from system 210, data store 214 can alternatively be located in data-processing system 210's memory, in some embodiments.

Display 212 is an image display device. Display 212 receives video signals conveying analysis results from data-processing system 210 and displays the signals in a manner that is visible to a user, in well-known fashion.

Data store 214 is an electronic data storage device. Data store 214 comprises non-transitory memory (e.g., a hard disk, etc.) that is used by sensor analytics system 200 to store, archive, and retrieve information, in well-known fashion. For example, data store 214 receives signals conveying video and/or analysis data from data-processing system 210 and archives the data. Data store 214 can also transmit supplemental information data to data-processing system 210 in response to a retrieval request, in some embodiments. Data store 214 can also transmit archived data to data-processing system 210 in response to a retrieval request, in some embodiments.

Telecommunications network 220 comprises a collection of links and nodes that enable telecommunication between devices, in well-known fashion. Telecommunications network 220 provides sensor analytics system 200 with connectivity to other systems that enable sensor analytics system 200 to retrieve data and also to transmit, store, and archive data as needed. In some embodiments, telecommunications network 220 is the Public Switched Telephone Network (PSTN); in some embodiments, network 220 is the Internet; in some embodiments, network 220 is a private data network. It will be clear to those with ordinary skill in the art, after reading the present disclosure, that in some embodiments network 220 can comprise one or more of the above-mentioned networks and/or other telecommunications networks, without limitation. Furthermore, it will be clear to those will ordinary skill in the art, after reading this disclosure, that telecommunications network 220 can comprise elements that are capable of wired and/or wireless communication, without limitation.

The user devices of sensor analytics system 200 include, but are not limited to, electronic devices such as wireless telecommunications terminal 212, personal computer 224, and personal digital assistant 226. Terminal 212 can be, for example and without limitation: a mobile, a cell phone, a smart phone, a cordless phone, and so on. Personal computer 224 can be, for example and without limitation: a desktop computer, a notebook computer, a tablet computer, and so on. The user devices can include one or more program applications that are designed to interact with data-processing system 210 in order to facilitate presentation of data to a user, for example and without limitation.

As those who are skilled in the art will appreciate, one or more of the user devices can be global positioning system (GPS)-enabled or are at least capable of providing an indication of a spatial and/or temporal event occurring at the user device.

Position determining equipment (PDE) 228 identifies the location of mobile devices, in well-known fashion. As those who are skilled in the art will appreciate, after reading this disclosure, PDE 228 is capable of determining the location of one or more of the other user devices depicted and of providing the location, with or without a timestamp to data-processing system 210. In doing so, PDE 228 is also capable of providing an indication of a spatial and/or temporal event occurring at a measured user device.

Data store 230 is capable of providing data related to spatial and/or temporal events. The data provided by data store 230 may have originated from other sources of data, such as terminal 222, computer 224, PDA 226, or PDE 228. In some embodiments, data store 230 is analogous to, and performs the same functions as, data store 214 described above.

The data points provided to data-processing system 210 from the aforementioned devices can include information relating to and/or identifying one or more particular events, users, or devices at a certain location and/or time. In accordance with an illustrative embodiment of the present invention, the event can correspond to a spatial-temporal event. In some embodiments, the event can correspond to one or more environmental changes, such as a change in weather or temperature. In some other embodiments, the event may correspond to a user activity, such as placing a phone call or purchasing an item either in person or through a network connected device. The event may correspond to public events or entertainment such as speeches, games, movies, dance shows, musicals, or sales promotions. In some embodiments, the event may correspond to a change in patterns, such as the onset of a traffic jam. In some other embodiments, the event may correspond to an electronic device based activity, such as the startup of computer program application or login activity. Other electronic device-based activity may be identified as well.

In some embodiments, the data points received by data-processing system 210 can include data provided from a wireless network-based communication device such as terminal 222. Such data may include, but is not limited to, i) the location of a particular cell phone within a cellular network at a particular time and/or ii) the GPS location and time data. Alternatively, or in addition, the data may include user information, such as a user identifier (ID) or an account ID associated with a particular device. The data originating at a communication device can be passed directly from the device or indirectly through another device such as PDE 228 or data store 230. In some embodiments, the data received by data-processing system 210 can be provided by a passive location-based service such as an ATM, which gives the location and/or time of a unique user. This also can include RFID-enabled devices such as RFID tags used for toll collection services, proximity cards, product and inventory tracking, and animal tracking and identification. Moreover, the data can include information that relates to the user device from which it is being provided, such as whether the device is a cell phone, laptop, personal digital assistant or GPS-enabled device.

The data points may be provided to data-processing system 210 in real-time as an event or activity occurs. For example, an RFID-enabled system may pass location and time data in real-time to data-processing system 210 when the RFID-enabled system is triggered by an RFID tag, such as those included in automobiles or proximity cards. Alternatively, or in addition, data may be provided from a data provider or data aggregator. The data provider or data collector can collect the data points over a specified period prior to sending them to data-processing system 210. For example, PDE 228 or data store 230 may store, over a specified time period, data that represents the occurrence of one or more particular events that occur on a computing platform, such as operating system startup, user login, or an application specific activity. The stored data then may be provided to data-processing system 210 periodically or sporadically according to a predetermined schedule or at user-specified times.

In some embodiments, the data provided to data-processing system 210 can include demographic and/or commercial information. Such information can be of a general nature or can be specifically associated with the locations and/or times of one or more events and/or activities.

In some embodiments, data-processing system 210, in order to perform some of its functions, also communicates, coordinates, and electronically interacts (wired or wirelessly as appropriate) with systems outside of sensor analytics system 200.

It will be clear to those skilled in the art, after reading the present disclosure, that the system illustrated in FIG. 2 can be embodied in different variations that are consistent with the present invention. For example, some embodiments comprise several displays such as display 212 for a plurality of users. For example, in some embodiments, data store 214 and/or data store 230 each comprise a plurality of data stores or a plurality of data storage technologies (e.g., a cloud-based storage system, etc.). For example, in some embodiments, not all depicted components are on-site. For example, in some embodiments, the depicted components are interconnected indirectly (e.g., through servers, gateways, switches, networks, the Internet, etc.). In any event, it will be clear to those skilled in the art, after reading the present disclosure, how to make and use sensor analytics system 200.

Figure 3:
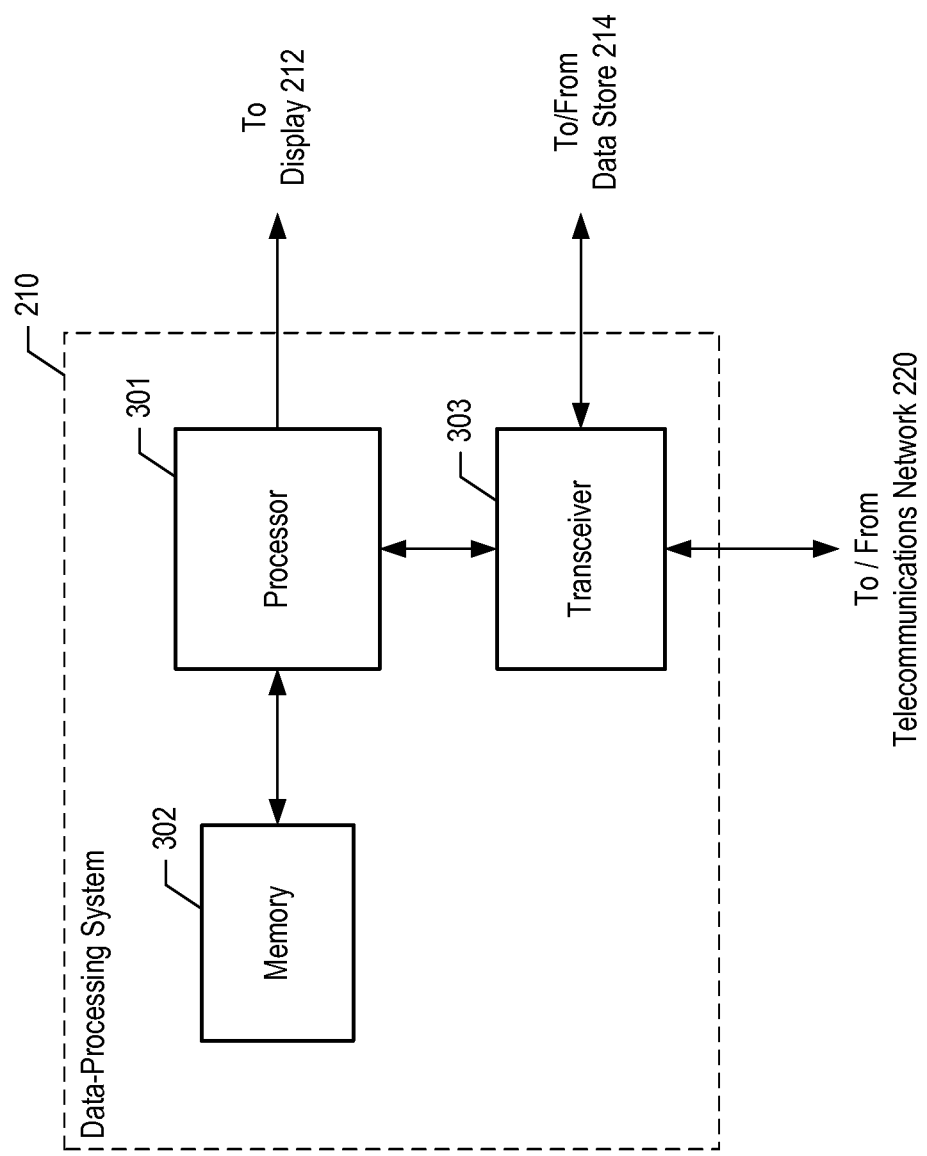
FIG. 3 depicts a block diagram comprising the salient elements of data-processing system 210, in accordance with an illustrative embodiment of the present invention.

FIG. 3 depicts a block diagram comprising the salient elements of data-processing system 210, in accordance with an illustrative embodiment of the present invention. Data-processing system 210 comprises: processor 301; memory 302; transceiver 303; and communication paths to display 212, data store 214, and telecommunications network 220, interconnected as shown.

Processor 301 is a processing device such as a microprocessor that, in conjunction with the other components in data-processing system 210, is capable of executing the software and processing the data according to the tasks described herein. Processor 301 processes data points and other data received via transceiver 303. After processing, it transmits video signals to display 212 based on the processing results. Processor 301 is well known in the art.

Memory 302 is non-transitory memory that stores program code and data sufficient to enable the execution of software and data processing according to the tasks recited herein. Memory 302 is well known in the art.

Transceiver 303 is a component that enables data-processing system 210 to communicate electronically, whether in a wired or wireless configuration, with other components internal and external to sensor analytics system 200, including receiving data from telecommunications network 220, such as data originating at the individual devices connected to network 220; and transmitting to and from data store 214 and external systems via telecommunications network 220. Transceiver 303 is well known in the art.

It will be clear to those skilled in the art, after reading the present disclosure, that data-processing system 210 can be embodied in a different configuration than that depicted, as a multi-processor platform, as a server (e.g., application server, etc.), as a sub-component of a larger computing platform, or in some other computing environment—all within the scope of the present invention. It will be clear to those skilled in the art, after reading the present disclosure, how to make and use data-processing system 210.

FIGS. 4 through 14 depict flowcharts and related examples of the salient tasks performed by data-processing system 210, in accordance with an illustrative embodiment of the present invention. The operations performed by system 210 are depicted in the drawings in a particular order. It will, however, be clear to those skilled in the art after reading this disclosure that such operations can be performed in a different order than that depicted or can be performed in a non-sequential order. For example, in certain circumstances, multitasking and parallel processing may be advantageous. Some or all of the depicted tasks can be combined, performed in a different order, performed by different devices. Some of the depicted tasks can be omitted.

Moreover, the separation of various components in the embodiments described herein should not be understood as requiring such separation in all embodiments. Furthermore, it will be clear to those skilled in the art, after reading this disclosure, that the described program components and systems can generally be integrated together in a single software product or packaged into multiple software products.

For pedagogical purposes, the tasks depicted in the flowcharts herein are presented from the perspective of applying to a single user. It will, however, be clear to those skilled in the art, after reading this disclosure, that the performed operations can be applied to multiple users, either concurrently and/or sequentially. Furthermore, the depicted tasks can be repeated, either periodically and/or sporadically, for example in order to update the information that is processed for one or more users.

Figure 4:
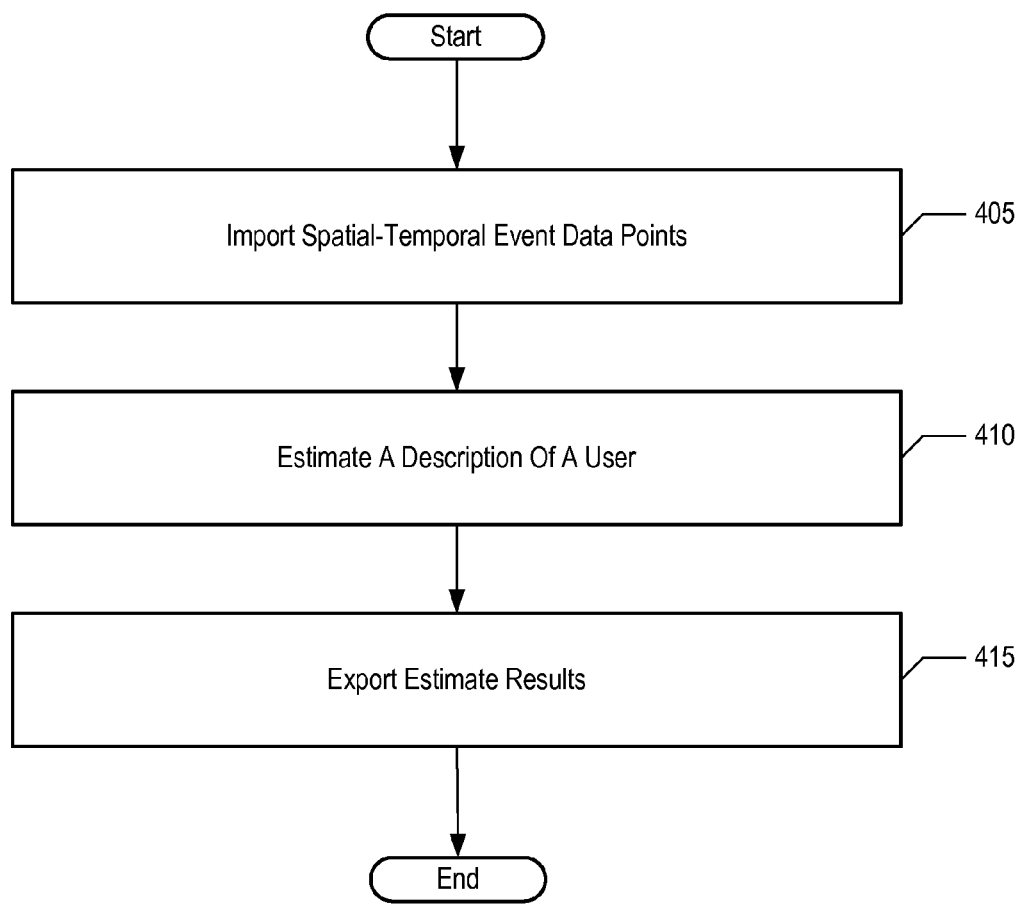
FIG. 4 depicts a flowchart of the salient tasks performed by data-processing system 210, in accordance with an illustrative embodiment of the present invention.

FIG. 4 depicts a flowchart of the salient tasks performed by data-processing system 210, as shown in FIG. 3, in accordance with an illustrative embodiment of the present invention.

At task 405, data-processing system 210 imports spatial-temporal (S-T) data points. The salient subtasks of task 405 are described below and with respect to FIG. 5.

At task 410, system 210 estimates a description for a user, based on one or more data points, or based on one or more characteristics, or both. Estimating such a description for each user, for example and without limitation, allows users to be compared (e.g., to each other, to a database, etc.) and classified. The salient subtasks of task 410 are described below and with respect to FIG. 6.

At task 415, system 210 exports the results of the estimate from task 410 to one or more other devices. The other devices can be, for example and without limitation, display 212, data store 214, terminal 222, computer 224, PDA 226, PDE 228, and/or data store 230. In exporting the results, system 210 transmits signals that convey the results in well-known fashion.

In accordance with the illustrative embodiment, the disclosed system is able to provide location-based, time-based, and other event-based services that are customizable to each user, based on each user's description estimate. For example, based on a user description specific to a particular user, the disclosed system may present an advertisement customized to that user. In addition or in the alternative, the disclosed system may present an advertisement customized to a particular user, based on one or more differences between that user's description and one or more other user descriptions. The disclosed system may present the advertisement, for example, by transmitting a signal that conveys the advertisement either directly to the user's device (e.g., wireless terminal, personal computer, etc.) or to another data-processing system.

Figure 5:
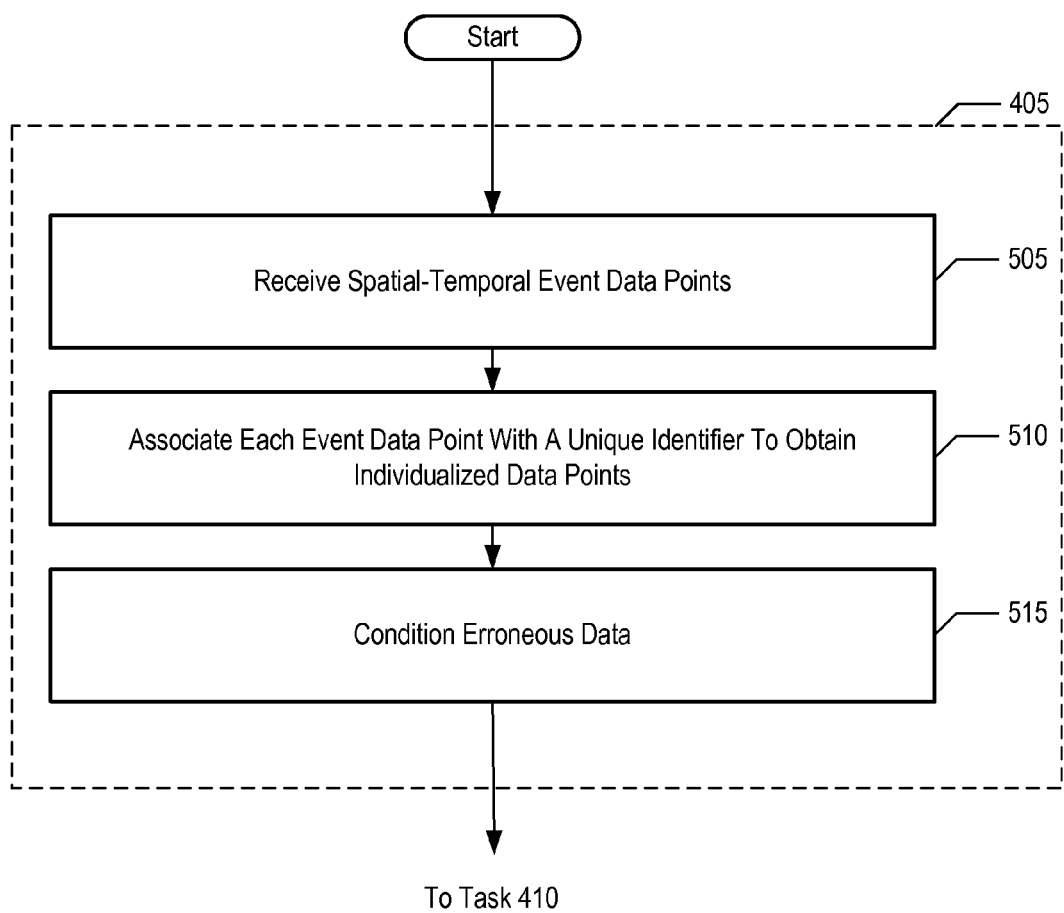
FIG. 5 depicts a flowchart of the salient subtasks of task 405.

FIG. 5 depicts a flowchart of the salient subtasks of task 405, in accordance with an illustrative embodiment of the present invention.

At task 505, data-processing system 210 receives one or more spatial-temporal data points originating from a user device (i.e., data point set D consisting of data points $d(t_i)$ occurring at different points in time $t_i$). In some embodiments, system 210 receives additional data used for processing the data points. In importing the data, system 210 receives signals that convey the data in well-known fashion.

At task 510, system 210 associates a unique identifier with each raw data point that is received, to obtain one or more individualized data points. Based on the information already contained within the data point, for example and without limitation, the unique identifier may correspond to a time stamp specifying a time the event occurred, a location stamp specifying a location of where the event occurred, a user stamp identifying the particular user to which the event corresponds, or a device stamp identifying a particular device from which the event data is received.

At task 515, system 210 detects location data that exhibits problems and corrects the data. The types of problems detected and corrected by system 210 include, but are not limited to: missing location data; duplicate records; observation gaps in time; forced snapping to discrete locations (e.g., roads, cell towers, arcs at a fixed distance from a cell tower, etc.); out-of-range location points; bursty behavior; incorrect or truncated data; and/or "superhuman" travel (e.g., travel faster than an airplane, etc.).

Figure 6:
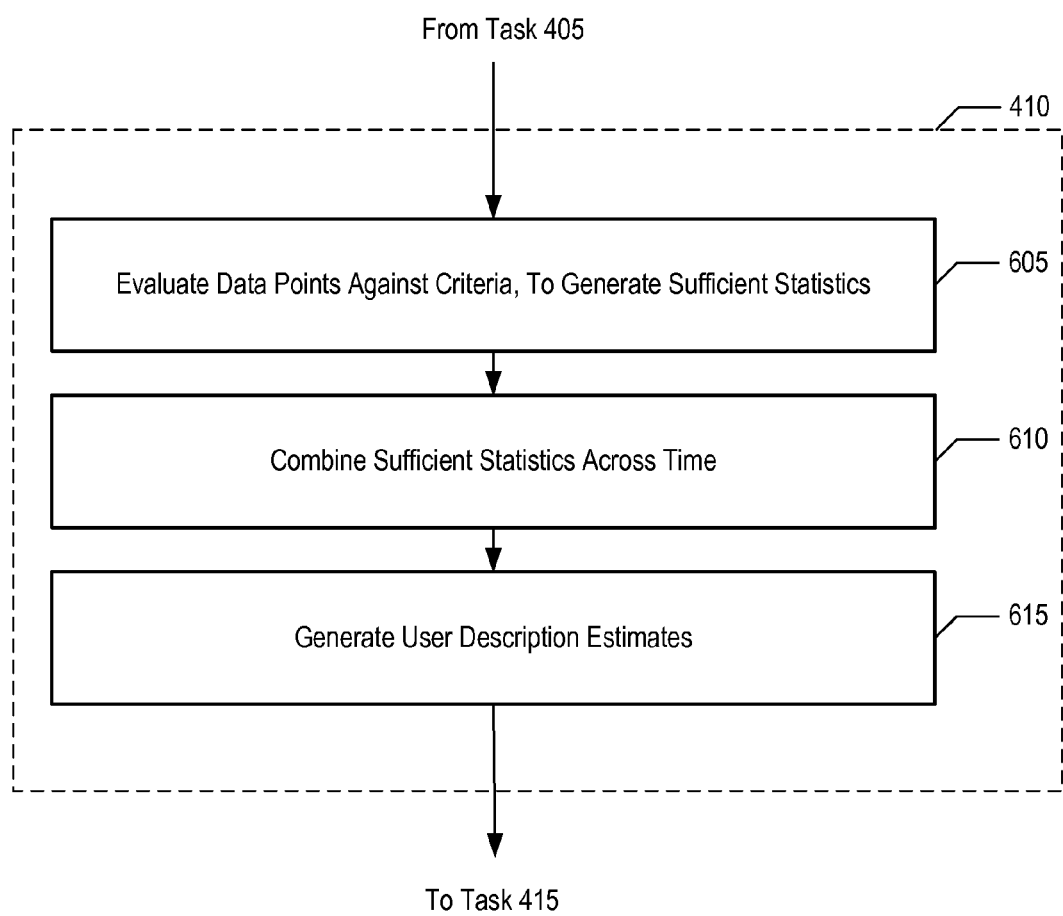
FIG. 6 depicts a flowchart of the salient subtasks of task 410.

FIG. 6 depicts a flowchart of the salient subtasks of task 410, in accordance with an illustrative embodiment of the present invention.

At task 605, data-processing system 210 evaluates one or more data points, in which a datum or data (e.g., latitude, longitude, timestamp, accuracy, metadata, identifier, etc.) that are represented by each data point, or information derived from these data (e.g., geolocation, time of day, date, etc.), are evaluated against one or more of:

i. a geographic area or areas,
    ii. a geographic point of interest or points of interest, and
    iii. other data points.

Moreover, system 210 evaluates one or more characteristics or other information against the areas and/or points of interest, in order to evaluate the data points further. For pedagogical purposes, the results of the evaluations are referred to as "sufficient statistics."

The salient subtasks of task 605 for generating the sufficient statistics are described in detail below and with respect to FIG. 7, along with the aforementioned characteristics and relationships in both time and space between data points. In accordance with an illustrative embodiment, each statistic generated is a precursor to a corresponding user attribute that constitutes a user description. As such, the statistics can be regarded as intermediate data between the received data points and the user attributes that constitute the estimated user descriptions.

At task 610, system 210 combines the sufficient statistics across time. In some embodiments, the time period across which the combining is to take place is configurable (e.g., one week, four weeks, etc.). In accordance with an illustrative embodiment, count data for a given user and a given spatial event (e.g., stadium, park, airport, etc.) is summed across the time instances (e.g., each day in a week, etc.) that make up a time period (e.g., one week, etc.). In some alternative embodiments, the combining task can comprise a function other than a straight summing of the counts, as those who are skilled in the art will appreciate.

At this point in the processing, the data is still preserved at a user level, but is now summarized across time. For example and without limitation, more recent statistics may be weighted more heavily than older statistics. In generating the statistics, system 210 reduces the quantity of the data to a tractable amount while still preserving enough information to generate user descriptions, as described below. As those who are skilled in the art will appreciate, after reading this disclosure, various sufficient statistics can be summarized across time to varying degrees with respect to one another, or not summarized across time at all.

At task 615, system 210 generates user description estimates, in part by normalizing and/or shrinking data that makes up each sufficient statistic. The salient subtasks of task 615 are described later and with respect to FIG. 11.

In a general sense, the process of going from the raw data being made available to system 210 (prior to task 605) to generating a user description (in task 615), including the user description's individual user attribute estimates, uses estimation theory techniques. Some of the actions performed by system 210 and associated with tasks 605, 610, and 615 make up one such estimation technique. However, as those who are skilled in the art will appreciate, after reading this specification, various estimation techniques can be used in place of, or to modify, some or all of the processing associated with tasks 605, 610, and 615 as described herein. For example, although there are other ways of system 210 to perform the normalization and shrinkage associated with task 615, the system of the illustrative embodiment can perform an entirely different set of tasks than normalization and shrinkage, in order to generate the user attribute estimates.

The user attribute estimates of the illustrative embodiment are "point estimates," in that system 210 generates a single number for each user attribute. In some embodiments, however, system 210 generates an "interval estimate," in that a specific confidence interval expressed in terms of a percentage (e.g., 95%, etc.) is given for the user attribute estimated, thereby allowing the uncertainty of the estimate to be reflected.

Figure 7:
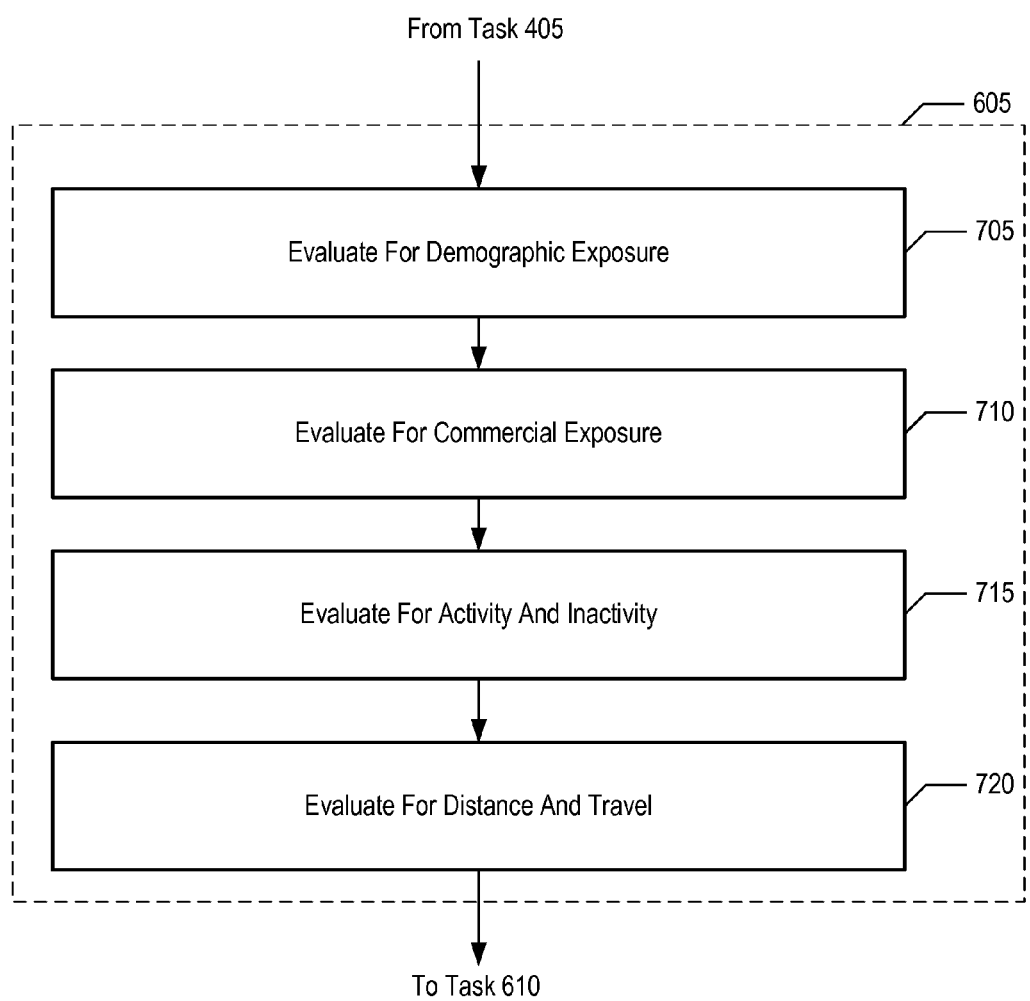
FIG. 7 depicts a flowchart of the salient subtasks of task 605.

FIG. 7 depicts a flowchart of the salient subtasks of task 605 for evaluating the data points of a user, in accordance with an illustrative embodiment of the present invention. As described earlier, system 210 performs these subtasks in order to generate sufficient statistics that system 210 uses, in turn, to generate user descriptions.

In accordance with the illustrative embodiment, system 210 evaluates a data point by comparing the data that it represents to some compared-to property. For example and without limitation, the datum being evaluated can be a latitude/longitude geolocation. The compared-to property can be the location of an area or point of interest. The comparison itself can involve determining whether the latitude/longitude of the data point is contained within the area or whether it is near the point of interest. As those who are skilled in the art will appreciate, a compared-to geographic area can be represented in software by a polygon that is defined by numeric coordinates that are stored in a memory. Based on the outcome of the comparison (e.g., the compared condition being true), system 210 then increments the corresponding event count that is used for tracking.

System 210 also evaluates the relationship of one or more data points with respect to one another. For example and without limitation, system 210 determines the user's usage gaps, which are based on the time differences between two or more data points of a user, and determines the user's distance traveled, which is a cumulative calculation of a user's distance traveled based on the geolocation information in the user's data points.

For each evaluation of a data point, in some embodiments, system 210 also evaluates one or more characteristics (i.e., $\{c_1, \ldots, c_H\}$ in characteristic set C, wherein H is a positive integer) or other information against the areas and/or points of interest. Specific examples of such evaluations are described below. System 210, in some embodiments, also evaluates the data point for the time of day and/or the calendar time (e.g., day, week, etc.) at which the corresponding event occurred and maintains event counts based on the time of day and/or the calendar time.

More specific examples and embodiments of the present invention are now discussed. At task 705, system 210 evaluates one or more data points of a user based on the user's demographic exposure—that is, the user's exposure to people. The demographic contexts of the various places that a user visits, coupled with the time of day visited (or not), impart information about a user's exposure to people and places.

In accordance with the illustrative embodiment, the demographic characteristics are used to measure a user's exposure to each of multiple demographic categories, as are enumerated below, and according to different dayparts (e.g., weekday day, weekday night, weekend day, and weekend night, etc.) and/or divisions of the week (e.g., 168 "weekhours," etc.). For each user, system 210 uses the demographic characteristics of the geographic areas (e.g., census blocks or tracts, etc.) that a user visits to determine a composite (e.g., an average, etc.) exposure description for that user on weekday days, weekday nights, and so on. For example, a first characteristic $c_1$ such as "gender" can have different values when assessed for a second geographic area $a_2$ and a third geographic area $a_3$ (i.e., represented as $c_1(a_2)$ and $c_1(a_3)$, respectively). In this example, the value for $c_1(a_2)$ might be "40% male population," and the value for $c_1(a_3)$ might be "52% male population." System 210 ascertains the value of the particular characteristic for the particular area, and increments a count to the exposure to the characteristic.

In order to describe a user in terms of their demographic exposure, system 210 measures one or more characteristics in various demographic categories, including and without limitation:
  i. census age group (e.g., age 30-34, age 35-39, etc.);
  ii. gender (male, female);
  iii. income (e.g., $75K-<$100K, $100K-<$125K, etc.);
  iv. race (e.g., White, Black, Asian, Hispanic, etc.);
  v. educational enrollment (e.g., High School, College, Not Enrolled, etc.);
  vi. marital status (e.g., single, married with children, etc.); and
  vii. educational attainment—highest grade attained (e.g., High School, College, etc).

In some embodiments, demographic exposure can also be measured in terms of, while not being limited to: other Census Bureau data, religion, ethnicity, national or regional origin, employment, occupation, vocation, career, hobby interest, sexual orientation, consumer preferences, consumer habits, or organizational memberships and participation.

Figure 8:
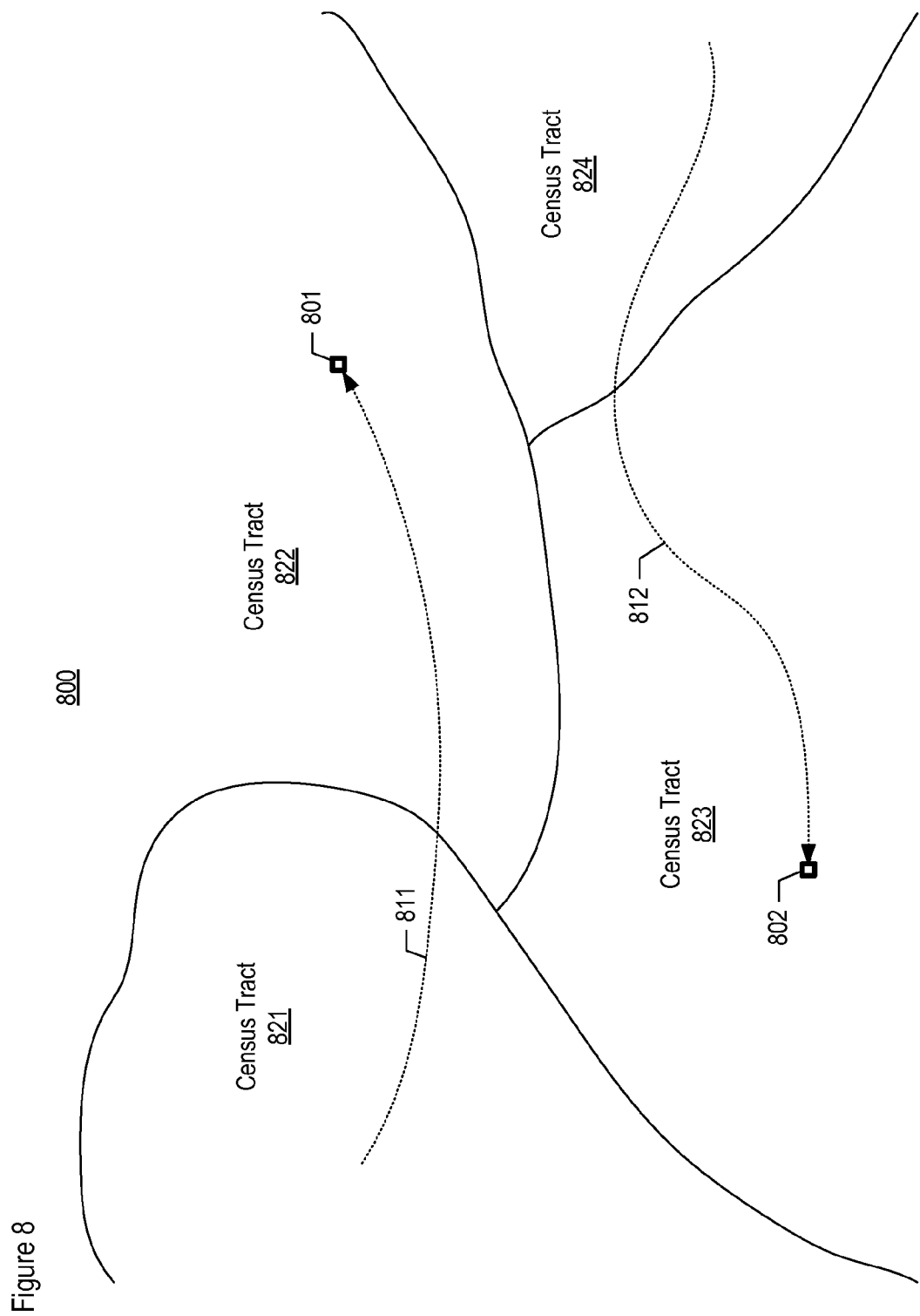
FIG. 8 depicts an example of describing users in terms of their demographic exposure.

An example of describing users in terms of their demographic exposure, specifically with respect to the demographic category of "race," is depicted in FIG. 8. Over the period of interest, user 801 is seen moving along path 811 through two geographic areas in area 800: census tract 821 and, presently, census tract 822. Census tract 821 has a demographic profile by category group of 10% White, 10% Black, and 80% Hispanic. Census tract 822 has a demographic profile of 70% White, 5% Black, 5% Asian, and 20% Hispanic. Assuming an equal number of pings (i.e., spatial-temporal events) in each visited census tract, on average user 801 has a demographic exposure of 40% White, 7.5% Black, 2.5% Asian, and 50% Hispanic. In contrast, more pings occurring in tract 821 than in tract 822 would weight the exposure assessment more toward the demographic profile associated with tract 821, and vice-versa, in some embodiments. In describing user 801, system 210 updates the corresponding user attributes (e.g., Demographic Exposure to Category Group 1, Weekday Day; Demographic Exposure to Category Group 2, Weekday Evening, etc.) for the user, in accordance with the illustrative embodiment.

Meanwhile, over the period of interest, user 802 is seen moving along path 812 through two other geographic areas in area 800: presently in census tract 823 and, earlier, in census tract 824. Census tract 823 has a demographic profile by category group of 10% White, 30% Black, 40% Asian, and 20% Hispanic. Census tract 824 has a demographic profile of 80% White, 5% Asian, and 15% Hispanic. Assuming an equal number of pings in each visited census tract, on average user 802 has a demographic exposure of 45% White, 15% Black, 22.5% Asian, and 17.5% Hispanic. In describing user 802, system 210 updates the corresponding user attributes (e.g., Demographic Exposure to Category Group 1, Weekday Day; Demographic Exposure to Category Group 2, Weekday Evening, etc.) for the user, in accordance with the illustrative embodiment.

In a variation of the above example, system 210 combines demographic exposures in a different way, namely by hour-groups of pings instead of by a straight number of pings. First, system 210 groups pings into groups by hour. Once grouped, every ping in an hour group of size G will get weight 1/G in the average. In other words, three pings in first hour will each get weight one-third, and two pings in the second hour will each get weight one-half. The resulting effect is that if there are two pings occurring in tract 821 in first hour and one ping in track 822 in the second hour, the same result would be obtained as if there were nine pings in tract 821 in first hour and three pings in tract 822 in second hour.

At task 710, system 210 evaluates one or more data points of a user based on the user's commercial exposure—that is, the user's exposure to business and commercial areas. In accordance with the illustrative embodiment, commercial exposure measures each user's exposure to various categories of businesses over time. The interpretation of commercial exposure is similar to that of demographic exposure, in that the commercial context of the places that a user visits, coupled with the time of day visited (or not), impart their qualities to the user.

In accordance with the illustrative embodiment, system 210 measures commercial exposure to each of numerous North American Industry Classification System (NAICS) commercial categories, as are known in the art. System 210 measures exposure to a particular geographic point of interest, or "POI" as is known in the art, when a user's location is in proximity to the POI. System 210 then ascertains the specific value for the characteristic $c_i$ of interest (e.g., "automobile dealer", "bed store," etc.) for the particular POI $p_i$, and increments a count to the exposure to the category value. In some embodiments, system 210 presents commercial exposure-based characteristics as a percentage "rate" such that the exposures are between 0 and 100. If there are multiple points of interest nearby, within the accuracy of the position determination or meeting other proximity-determining criteria, system 210 considers all exposures as valid.

System 210 measures commercial exposure distinctly in the following commercial categories and without limitation:
  i. Commercial exposure to each of J NAICS codes;
  ii. Commercial exposure to each of K restaurant types;
  iii. Commercial exposure to each of L cuisine types; and
  iv. Commercial exposure to each of M top chains (e.g., Circle K, Starbucks, etc.),
wherein J, K, L, and M are positive integers. System 210 tracks commercial exposure to NAICS codes such as, for example and without limitation: automobile dealers, new only or new and used; all-terrain vehicle (ATV) dealers; bed stores, retail; quick-lube shops; undercoating shops, automotive; and wind and water erosion control agencies, government.

Figure 9:
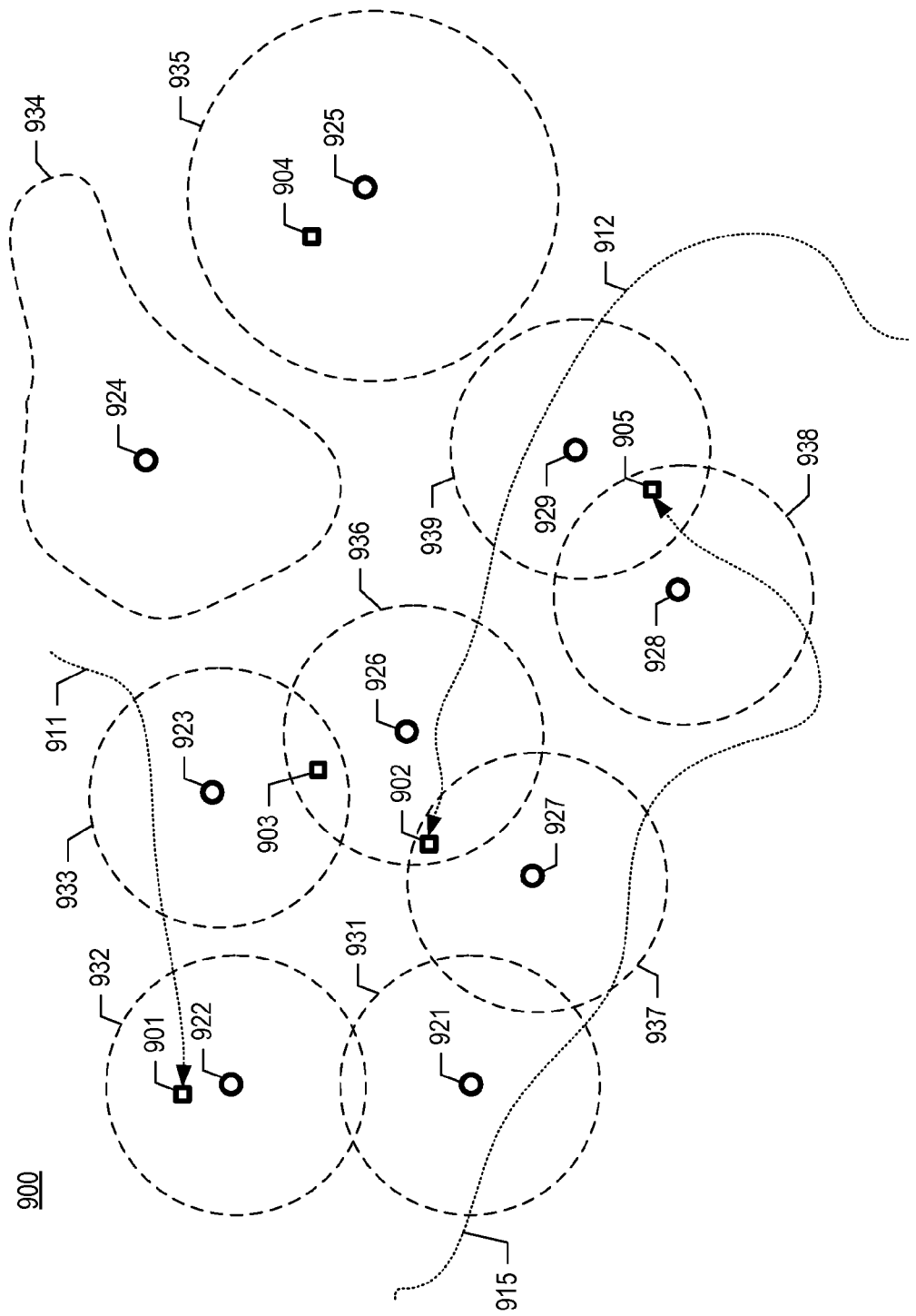
FIG. 9 depicts an example of describing users in terms of their commercial exposure.

An example of describing users in terms of their commercial exposure, specifically with respect NAICS category, is depicted in FIG. 9. Over the period of interest, users 901 through 905 can be seen throughout area 900. Some users (i.e., users 901, 902, and 905) have moved during the period of interest (along paths 911, 912, and 915, respectively) while some users have not (i.e., users 903 and 904). Also depicted are the locations of businesses 921 through 929. For illustrative purposes, each business location can be considered as having an associated area of proximity (i.e., proximity areas 931 through 939, respectively), which is defined to be the area within which the user is considered to be at the POI.

As those who are skilled in the art will appreciate after reading this specification, a user can be considered to be at or near a POI based on a variety of criteria. For example and without limitation, the area of proximity can be related to the uncertainty (e.g., accuracy) of the position determination. The area of proximity can be configured (engineered) ahead of time as a specified distance to the POI. The area of proximity can be made uniform or non-uniform, in shape and/or in area, as shown in the drawing. In some embodiments, the user's device can be considered to be at or near one or more POIs when its position is within a specified distance (e.g., 50 meters, etc.) of each POI that the data point is evaluated against. In some other embodiments, system 210 can find the P closest points and determine the POI or POIs based on a weighting of the distances.

As can be seen in FIG. 9, each user's present location and path is characterized as having been exposed to one or more businesses, as defined by their areas of proximity. More specifically, each user can be described as having been exposed to specific NAICS categories (i.e., corresponding to the business locations depicted), where the user's description can be further shaped based on the relative number of pings associated with each NAICS category that the user was exposed to. In describing each user, system 210 updates the corresponding user attributes (e.g. Exposure Rate to Business Category 1, Exposure Rate to Business Category 2, etc.) for the user, in accordance with the illustrative embodiment of the present invention.

As with the concept of demographic exposure described earlier and with respect to FIG. 8, system 210 can apply normalization by hour-group also to commercial exposure, in some embodiments. In other words, instead of incrementing ping counts by one for every ping exposed, system 210 can increment by 1/G, wherein G is the number of pings in that hour-group.

Furthermore, system 210 can use an additional level of normalization in the case of commercial exposure. In particular, system 210 can optionally normalize at the ping level. For example, if a single ping is exposed to 10 places (e.g., 10 businesses adjacent to one another, etc.), then instead of incrementing the counters associated with each of those 10 places by one, system 210 increments each counter by one-tenth. This has the effect of spreading the weight equally among the places in situations where it is unclear which specific place out of the ten the user actually visited. In another variation, system 210 accounts for both hour-group and the 10 adjacent places by normalizing using the factor 1/(10*G). In yet another variation, system 210 can spread out the weight from a single ping in other ways, such as in proportion to the distance between the location and the POI, or in proportion to the overall popularity of that POI based on data from another source.

At task 715, data-processing system 210 evaluates one or more data points of a user based on amount and pattern of activity, as well as inactivity. The context of various activity and inactivity patterns, as well as the amount of activity, exhibited by a user over time impart useful information about a user.

In accordance with the illustrative embodiment, system 210 tracks a user's activity. In accordance with an illustrative embodiment, each activity-related event count measures the number of user S-T events in a particular weekhour, and reports a relative weekhour activity based on the total activity across all weekhours. For each user, system 210 tracks one event count per each weekhour in a week (i.e., weekhour 1 count through weekhour 168 count). In some other embodiments, system 210 can track user activity based on some other partitioning across time.

Additionally, system 210 tracks specific types of user events or actions occurring, which are derivable from the event-related information that is available in the received data points and which have corresponding time and location information. Such events or actions that can be tracked include, while not being limited to, a taxi cab being full in the warehouse district at 2:00 am, texting occurring, tweeting occurring, and so on. As those who are skilled in the art will appreciate, after reading this disclosure, system 210 can track other types of events or actions.

In accordance with the illustrative embodiment, data-processing system 210 also tracks a user's inactivity (in contrast to "activity"), which is inferred from usage gaps in the data points received for a user. Such gaps are continuous time periods when a user is completely inactive, from a spatial-temporal event perspective. A usage gap is defined as the difference of time (e.g., in seconds, etc.) between two consecutive events, manifested as data points $d(t_i)$ and $d(t_{i+1})$ representing the user. System 210 measures the length of each gap and characterizes the gap into one of B buckets, wherein B is a positive integer. There is one usage characteristic per usage gap "bin," corresponding to the count of gaps observed for that bin length. As those who are skilled in the art will appreciate, after reading this disclosure, the value of B can be selected in order to provide a good balance between sufficient resolution and having too many individual characteristics to track.

Figure 10:
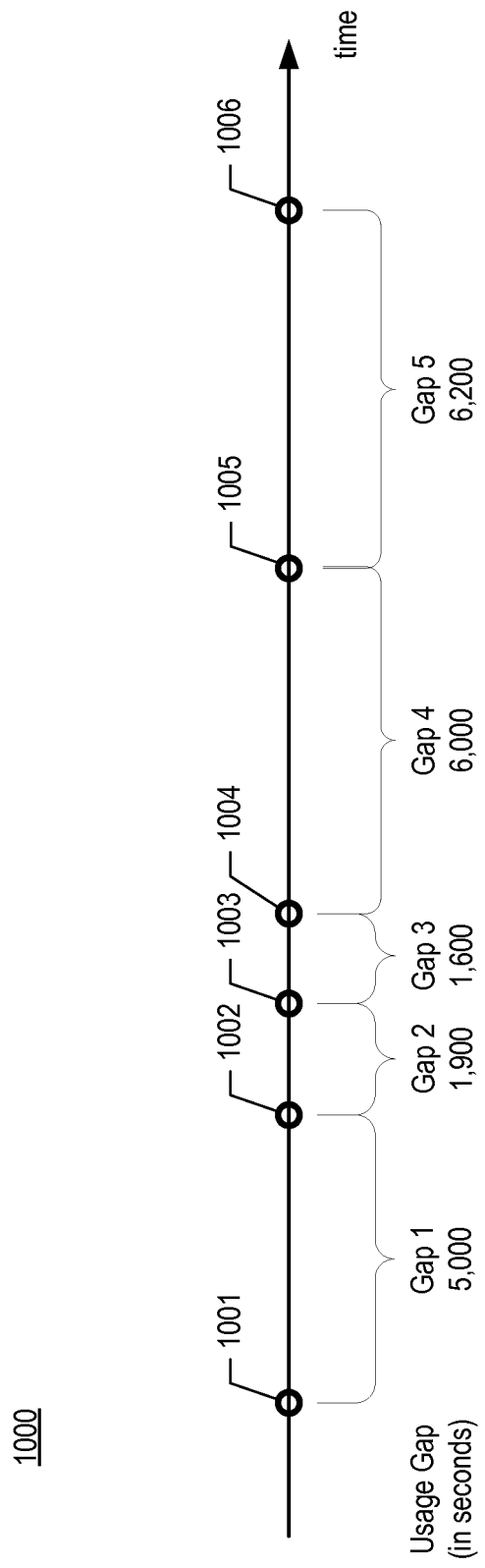
FIG. 10 depicts occurrences of events that are attributable to a particular user, across a timeline.

For example and as depicted in FIG. 10, occurrences of events that are attributable to a particular user are shown as pings 1001 through 1006 across timeline 1000. Gaps in time exist between consecutive pings. In accordance with the illustrative embodiment, data-processing system 210 measures the length of each gap (i.e., determines the time difference between consecutive pings), characterizes the gap into one of the B buckets, and updates the corresponding count and/or percentage rate. Different gap patterns and/or ping patterns, such as those depicted in FIG. 10, can be used in support of estimating a description of a user.

Figure 11:
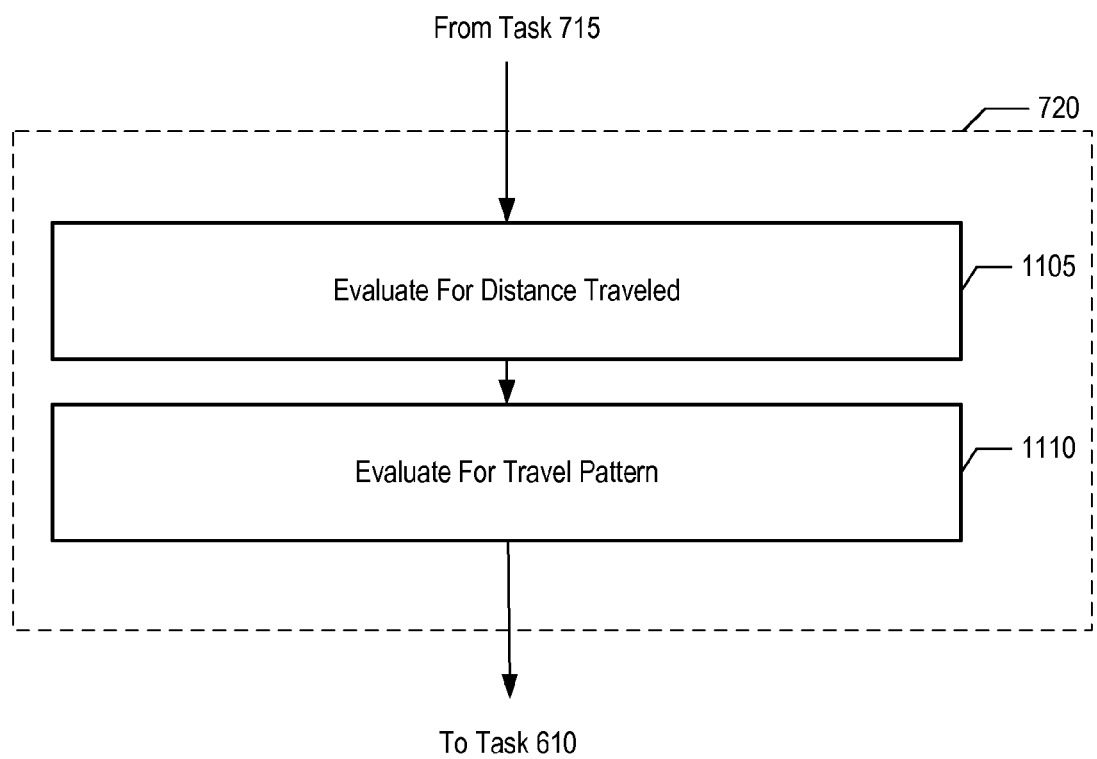
FIG. 11 depicts a flowchart of the salient subtasks of task 720.

At task 720, system 210 evaluates one or more data points of a user based on the user's distance traveled and travel pattern, as depicted in FIG. 11. The contexts of amount of distance traveled and the travel pattern exhibited by a user over time impart useful information about a user.

At task 1105, system 210 evaluates the data points of a user, based on distance traveled. In accordance with the illustrative embodiment, system 210 tracks a user's distance traveled by measuring the sum of distance traveled between consecutive S-T events per unit time (e.g., per week, etc.). System 210 calculates distance-related event counts, on the basis of predetermined time segment (i.e., daypart). In addition, system 210 calculates the median, standard deviation, and mean distance between consecutive S-T events per hour, on the basis of predetermined time segment (i.e., daypart). System 210 also tracks the number of pings with valid location data used in the calculation of each distance-traveled count.

At task 1110, system 210 evaluates the data points of a user, based on the user's travel pattern or patterns. In accordance with the illustrative embodiment, system 210 counts the number of places visited. System 210 also determines the entropy of travel, where entropy is a statistical measure of randomness. High entropy is associated with a uniform number of visits to different places. Low entropy is associated with a high number of visits to a small number of places, with low visits to other places. One can view a user's entropy as a measure of how evenly the user visits different places.

Figure 12:
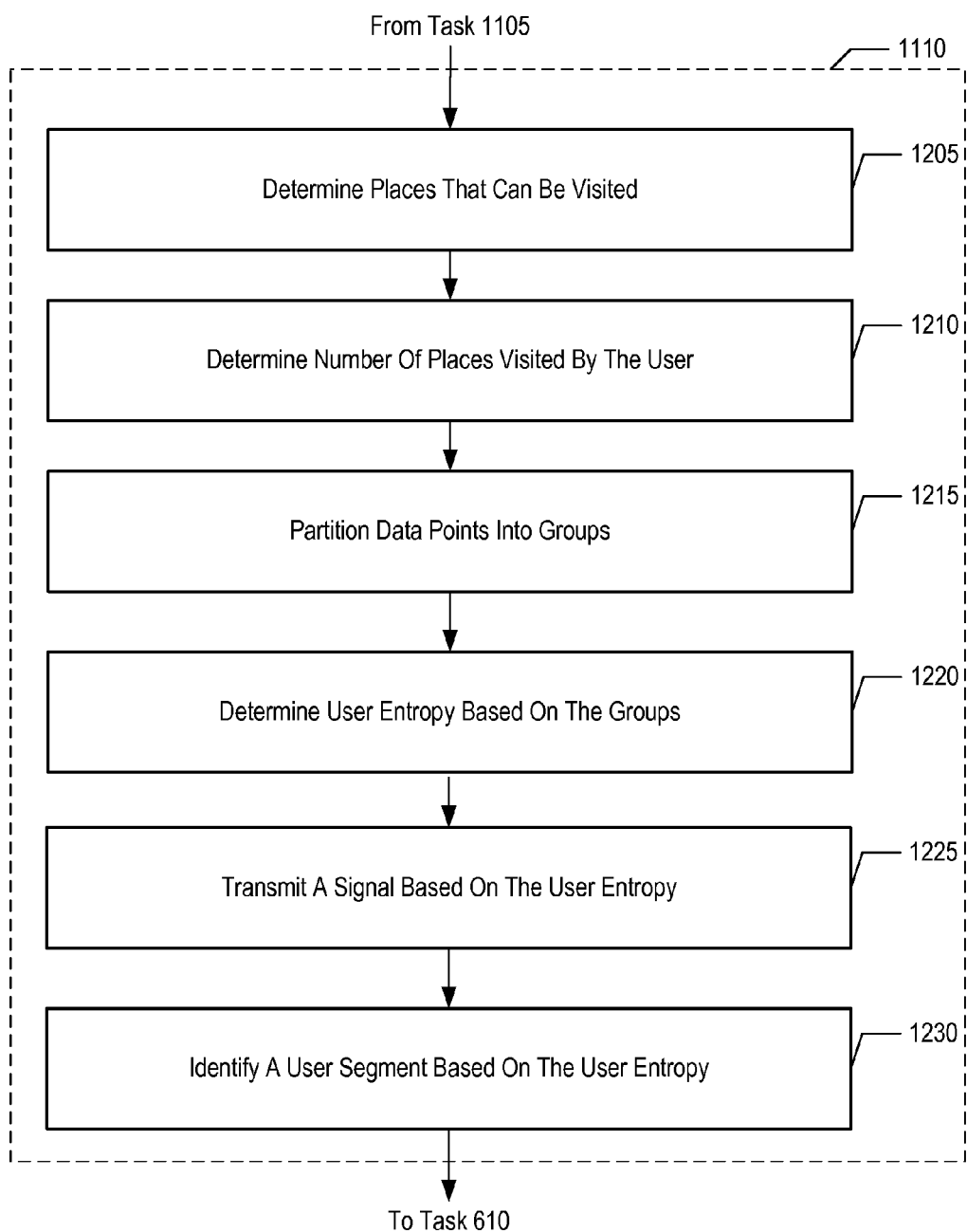
FIG. 12 depicts a flowchart of the salient subtasks of task 1110.

FIG. 12 depicts a flowchart of the salient subtasks of task 1110. At task 1205, system 210 determines a non-empty set of places that can be visited. System 210 can obtain the set of places, or information for determining the set of places, from an external source (e.g., a technician performing an analysis on the data points, etc.), can generate the set autonomously, or can determine the set through other means. In accordance with the illustrative embodiment, the set of places is based on a partitioning of a geographic area of interest into multiple grid cells, wherein each grid cell applied to the geographic area is a distinct place that can be visited within the geographic area.

In an illustrative operational scenario, a technician first determines a type of user behavior to be detected, as related to travel patterns. Based on the behavior to be detected, the technician chooses an appropriate grid cell size, in order to evaluate user entropy with respect to that grid cell size. For example, a technician might choose i) a large, city-size grid cell in order to detect business travelers journeying from one city to the next, ii) a medium, town-size grid cell to detect soccer moms traveling in the suburbs, or iii) a small, street block-size grid cell to detect urban college students getting around in the city. As another example, one or more dimensions (e.g., length, width, etc.) of each grid cell can be based on a predetermined characteristic of the user such as, while not being limited to, the user's distance traveled.

At task 1210, system 210 determines the number of places that each user has actually visited. System 210 determines this number for each user based on comparing the user's data points with the non-empty set of places that can be visited, determined at task 1205. For example, if system 210 has determined 1000 distinct places that can be visited within a particular geographic area and has received 10,000 data points within a given time segment that map into 25 of the 1000 distinct places, then system 210 updates the count of places visited to 25 for the particular user.

System 210 tracks the number of places visited by each user, in terms of overall measurement to date and for each predetermined time segment (i.e., daypart). In the previous example, system 210 has determined 1000 distinct places that can be visited within a particular geographic area and has received 10,000 data points within a given time period that map into 25 of the 1000 distinct places. System 210 updates the overall count of places visited to 25 for the particular user. Additionally, system 210 might identify that 10 of those places were visited during the weekday day daypart, 5 during weekday night, 8 during weekend day, 7 during weekend night, and so on. Because a particular place may be visited during multiple dayparts, the sum of the individual daypart counts may exceed the overall count.

At task 1215, system 210 partitions a user's data points into N groups, N being a positive integer, wherein the number of groups N is equal to the number of places actually visited (i.e., the number of different places to which the user's data points correspond), as counted by system 210 at task 1210. In accordance with the illustrative embodiment of the present invention, the different groups correspond to the grid cells actually visited, from the set of possible grid cells applied to the geographic area of interest at task 1205. It will be clear, however, to those skilled in the art, after reading this specification, how to make and use alternative embodiments of the present invention that feature a method of partitioning other than by visited grid cell. For example and without limitation, partitioning can be achieved based on standard geographical boundaries (e.g., states, zip codes, census tracts, census block groups, etc.), or by using any standard clustering method (e.g., k-means clustering, Gaussian mixture modeling, etc.).

System 210 partitions the user's data points, in terms of overall measurement to date and for each predetermined time segment. Thus, the number of groups N can vary from one time segment to the next, for each user.

As part of the partitioning, for each user and time segment, system 210 determines the size g(i) of each group i, for i from 1 to N, wherein size g(i) represents the number of data points occurring in group i.

For each user and time segment, system 210 also tracks the number of pings with valid location data used in the calculation of each travel count (e.g., count of places, entropy, etc.).

In accordance with the illustrative embodiment, system 210 calculates the number of pings S for each user as:

$$S = \Sigma_{i=1}^{N} g(i). \quad \text{(Eq. 1)}$$

At task 1220, system 210 determines an entropy H for each user, based on the entropy equation:

$$H = -\Sigma_{i=1}^{N} p(i) \cdot \ln[p(i)], \quad \text{(Eq. 2)}$$

wherein p(i) is the probability mass function, equal to g(i)/S.

As those who are skilled in the art will appreciate after reading this specification, an alternative entropy equation can be used.

System 210 determines one or more entropy values for each user, based on time segment, geographic area of interest, grid cell size, and so on.

Figure 13A:
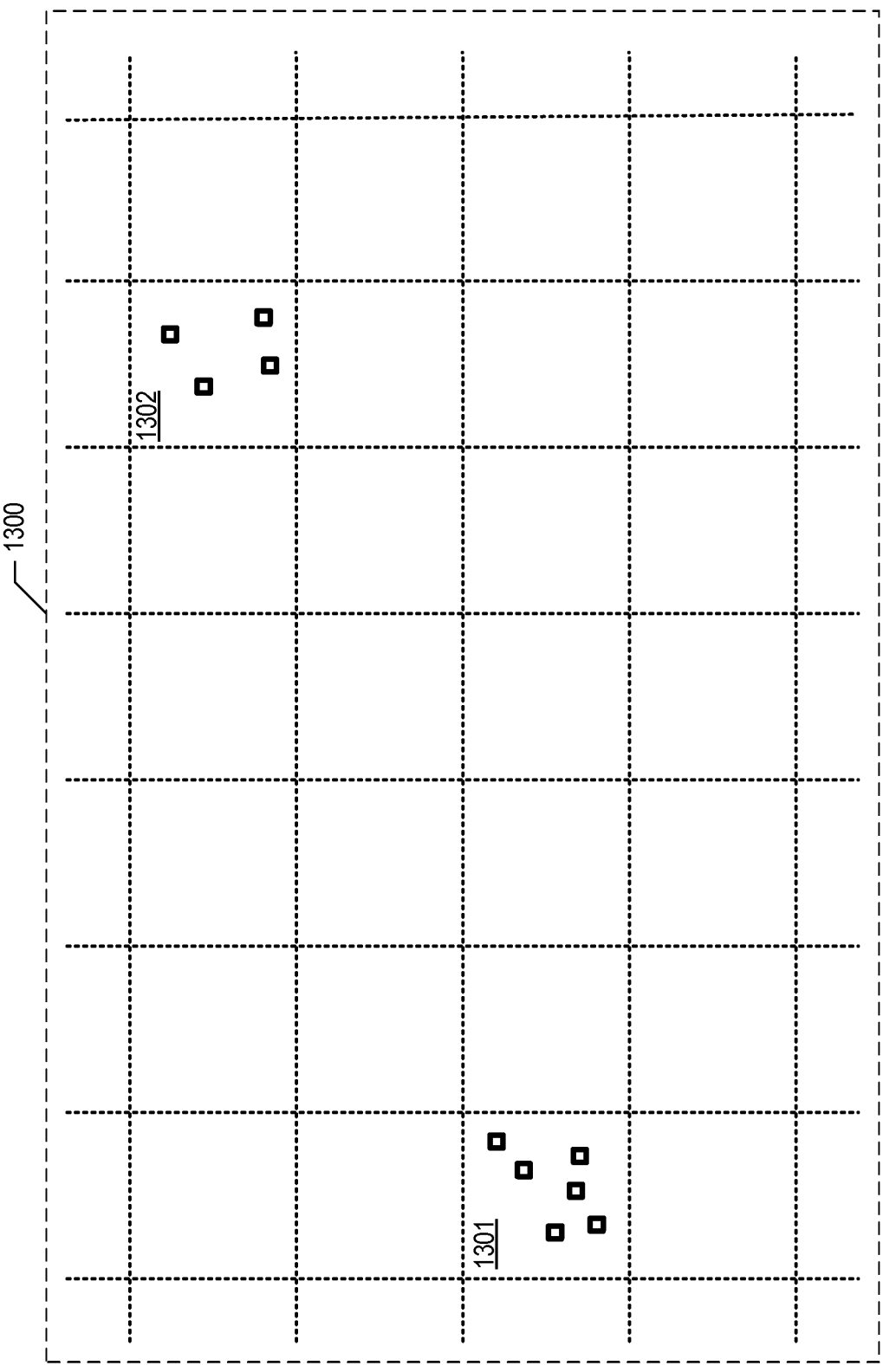
FIG. 13A-D depict examples of different travel patterns throughout area 1300.

It is important to understand how entropy can be affected by a user's travel pattern and other parameters. FIGS. 13A through 13D depict examples of different travel patterns throughout geographic area 1300, characterized by different user entropy values. In FIG. 13A, a first user's travel pattern is characterized by numerous visits to two places, denoted by grid cell 1301 and grid cell 1302. Grid cell 1301 comprises the user's home, and place 1302 comprises the first user's workplace. Here, the first user's travel pattern is characterized by low entropy, in that there are a relatively high number of visits to a relatively small number of places.

Figure 13B:
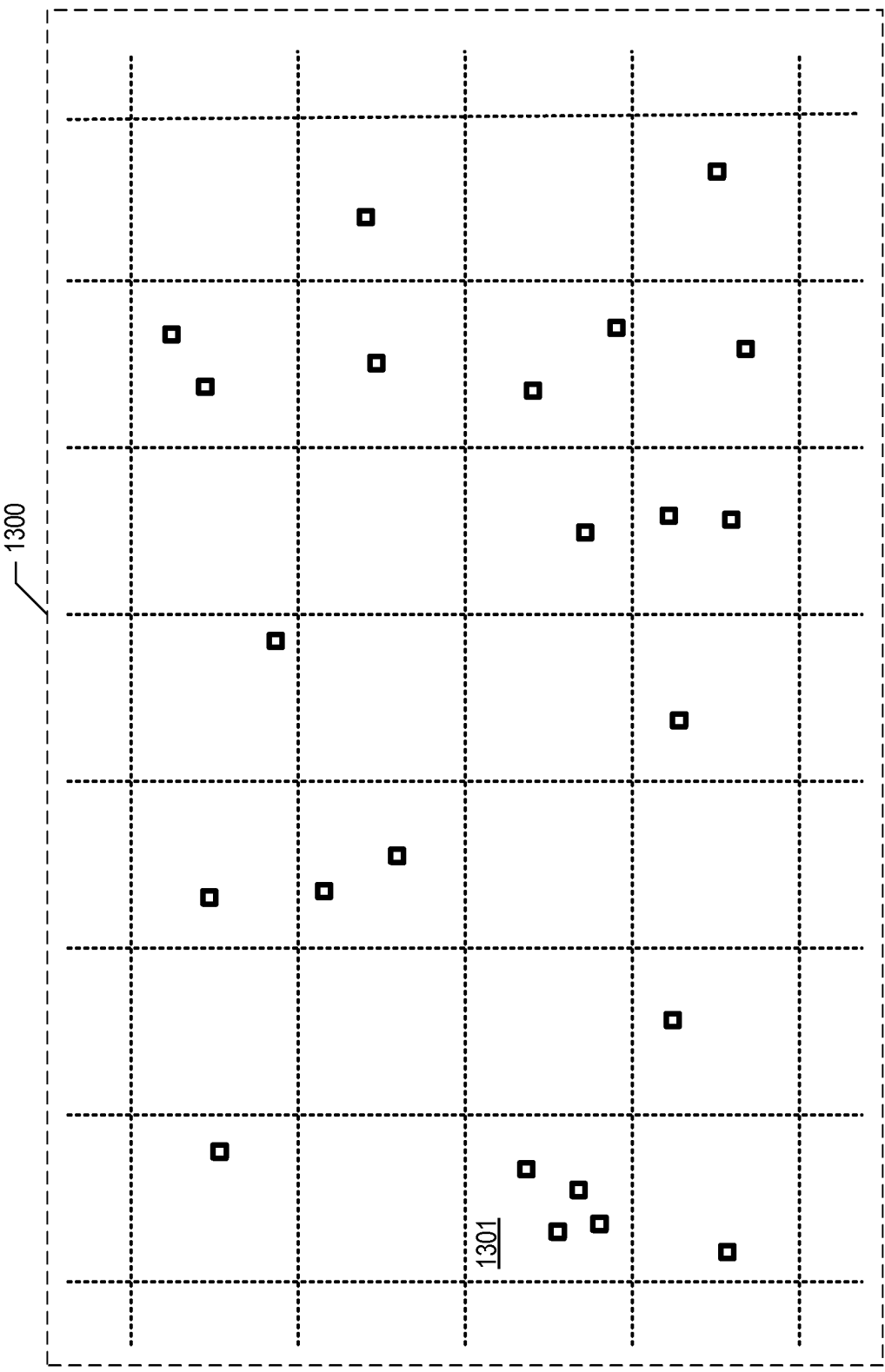

In contrast, FIG. 13B depicts a different scenario, in which a second user's travel pattern is characterized by visits to many places. Although the second user has made several visits to her home, also located within grid cell 1301, the second user has visited many other places and at a relatively uniform rate. Here, the second user's travel pattern is characterized by low entropy, in that there are a relatively uniform number of visits to a relatively large number of places.

Figure 13C:
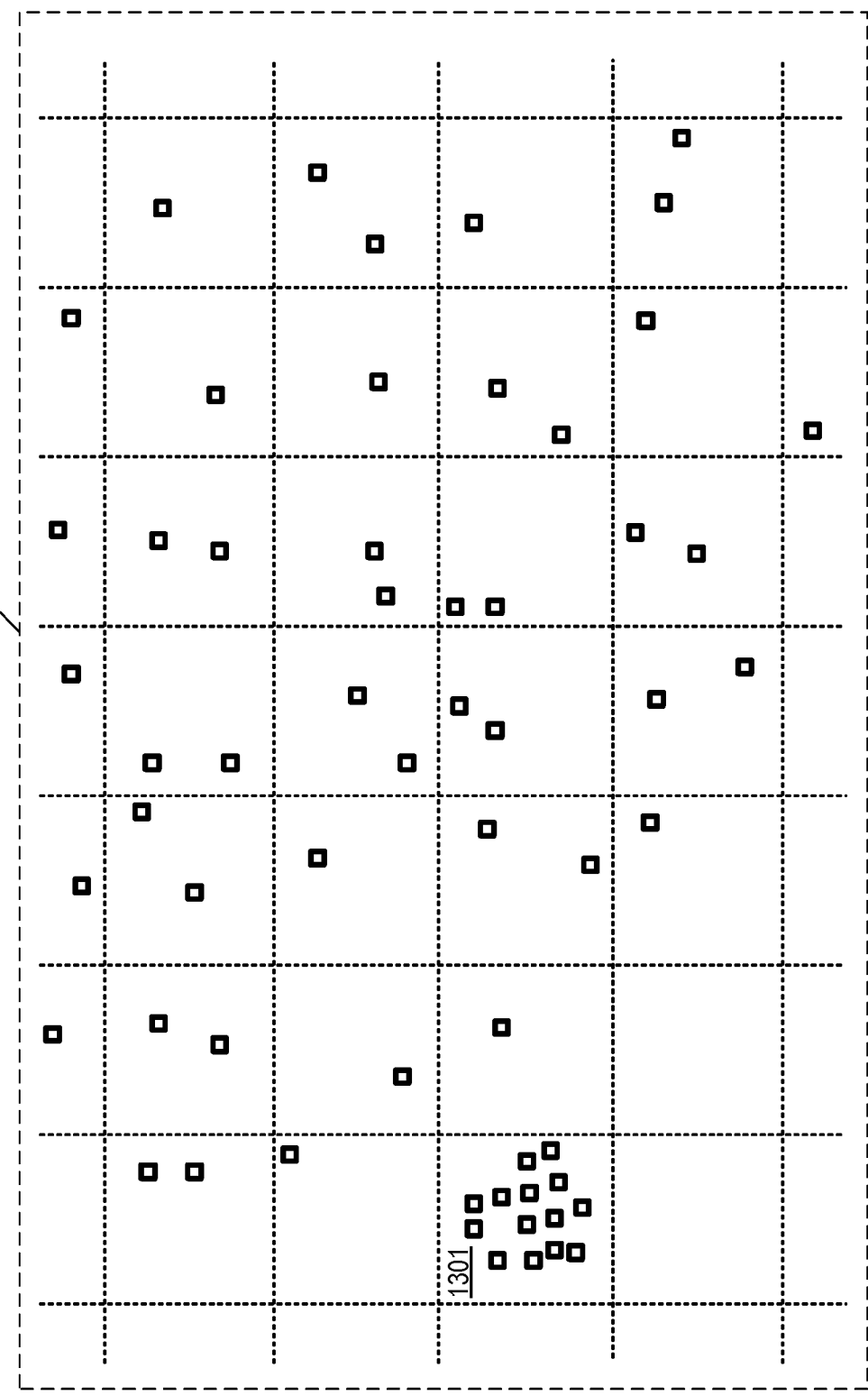
Figure 13D:
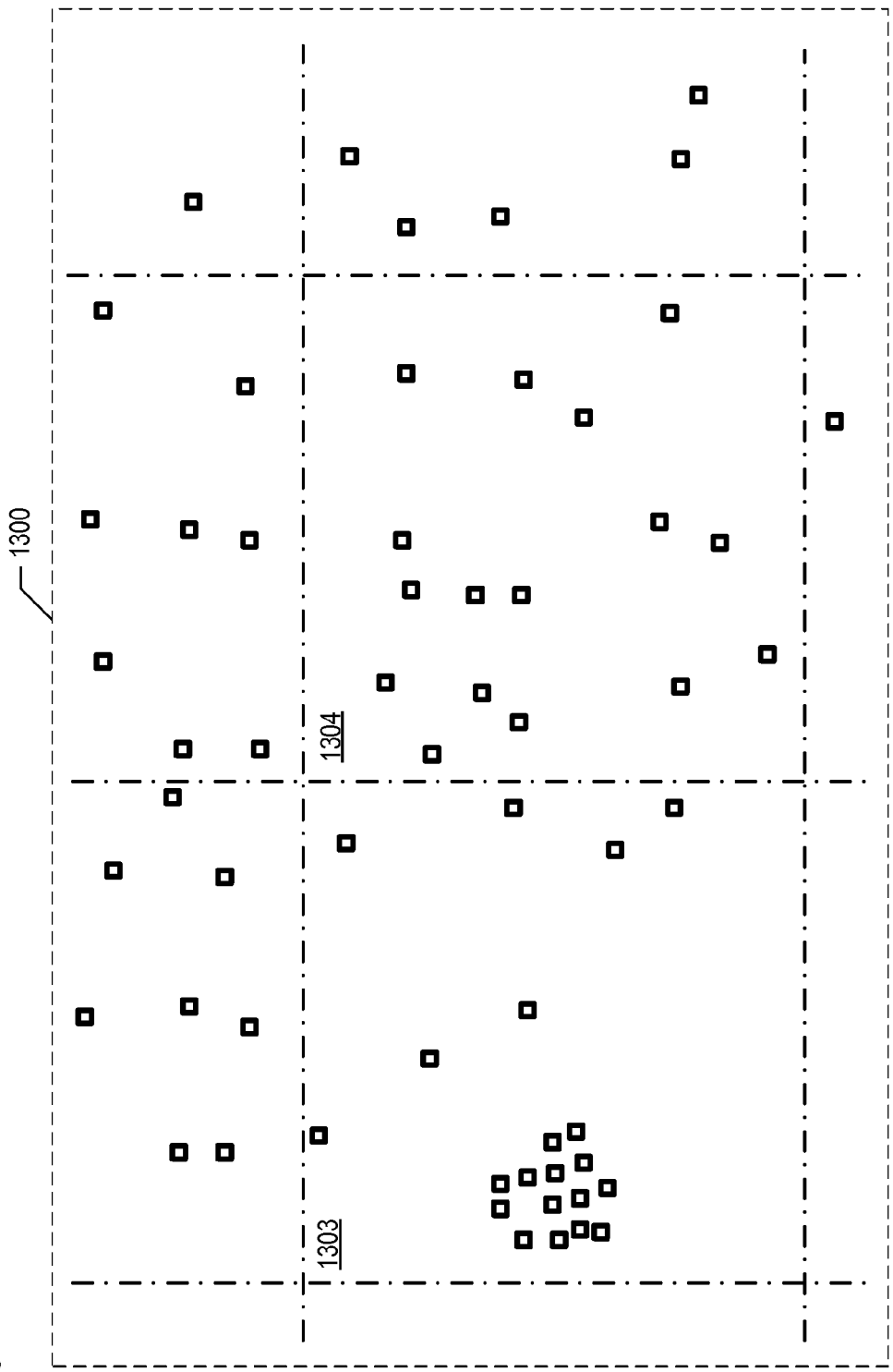

FIGS. 13C and 13D depict how a choice of grid cell size can affect the entropy value of a given user's travel patterns. Both figures contain the same distribution of data points in relation to overall geographic area 1300. The difference between the two figures is in the choice of grid cell size; that is, each dimension (length and width) of a grid cell in FIG. 13D is three times that of a grid cell in FIG. 13C.

Both figures depict an example of a third user who spends a significant amount of time at his home, which is located in FIG. 13C within grid cell 1301 and in FIG. 13D within grid cell 1303, which comprises the smaller area of grid cell 1301. When analyzed with the smaller grid cell size in FIG. 13C, the user's travel pattern suggests at least a moderate level of entropy, in that there are many data points concentrated within single grid cell 1301 with a relatively small number of data points (i.e., 1-2 data points) within most of the other grid cells. When analyzed with the larger grid cell size in FIG. 13D, however, the travel pattern of the same user suggests a lower level of entropy, in that the number of data points in each of grid cells 1303 and 1304, for example, are equalized somewhat owing to the change in grid cell size. By considering different grid cell sizes, or different geographic areas, or both, system 210 is able to perform different actions, based on different entropy values being attributed to the same travel pattern.

Referring back to FIG. 12, at task 1225 system 210 transmits a signal (e.g., a software or hardware trigger, an information-encoded message, a function that conveys information, etc.) indicating an action to be performed, wherein the action to be performed is based on one or more entropy values determined at task 1220. As a first example, system 210 transmits a signal to quantify a user's predictability based on the user's entropy determined at task 1220; this is based on entropy being known in the art as a fundamental quantity for capturing the degree of predictability of a system. As a second example, system 210 transmits a message (e.g., an advertisement, etc.) to one or more users (e.g., the user whose entropy has been determined, etc.), wherein the content of the message is based on the user's entropy determined at task 1220.

In some embodiments of the present invention, the action to be performed is based the determined entropy values for a given user across two or more dayparts. In some other embodiments of the present invention, the action to be performed is based on the determined entropy values for a given user when different sizes of grid cells are applied in order to determine i) the set of places that can be visited and, ii) from that set, the places that are actually visited.

At task 1230, system 210 identifies one or more user segments, based on the determined entropy values for one or more users. A "user segment" is an identifiable group of individuals, sharing one or more characteristics or needs. One application of identifying user segments is to enable an organization to target different categories of individuals who perceive the value of certain goods and services differently from one another. In some embodiments of the present invention, system 210 identifies the one or more user segments, based on one or more dayparts.

As an example of the foregoing concepts, one or more users who are frequenting many bars at night can give rise to a "bar hopper" user segment, whereas one or more users who stay at the same bar can give rise to a "bar fly" user segment. In this example, the "bar hoppers" exhibit relatively high entropy, and consequently low predictability, and the "bar flies" exhibit relatively low entropy, and consequently high predictability, at least at night. The type of advertising marketed toward the "bar flies," or other individuals with high predictability within a particular context, can be customized differently from that marketed toward the "bar hoppers," or other individuals with low predictability within a particular context (e.g., time segment, type of activity, etc.).

In some embodiments of the present invention, system 210 then associates one or more users with each identified user segment.

Figure 14:
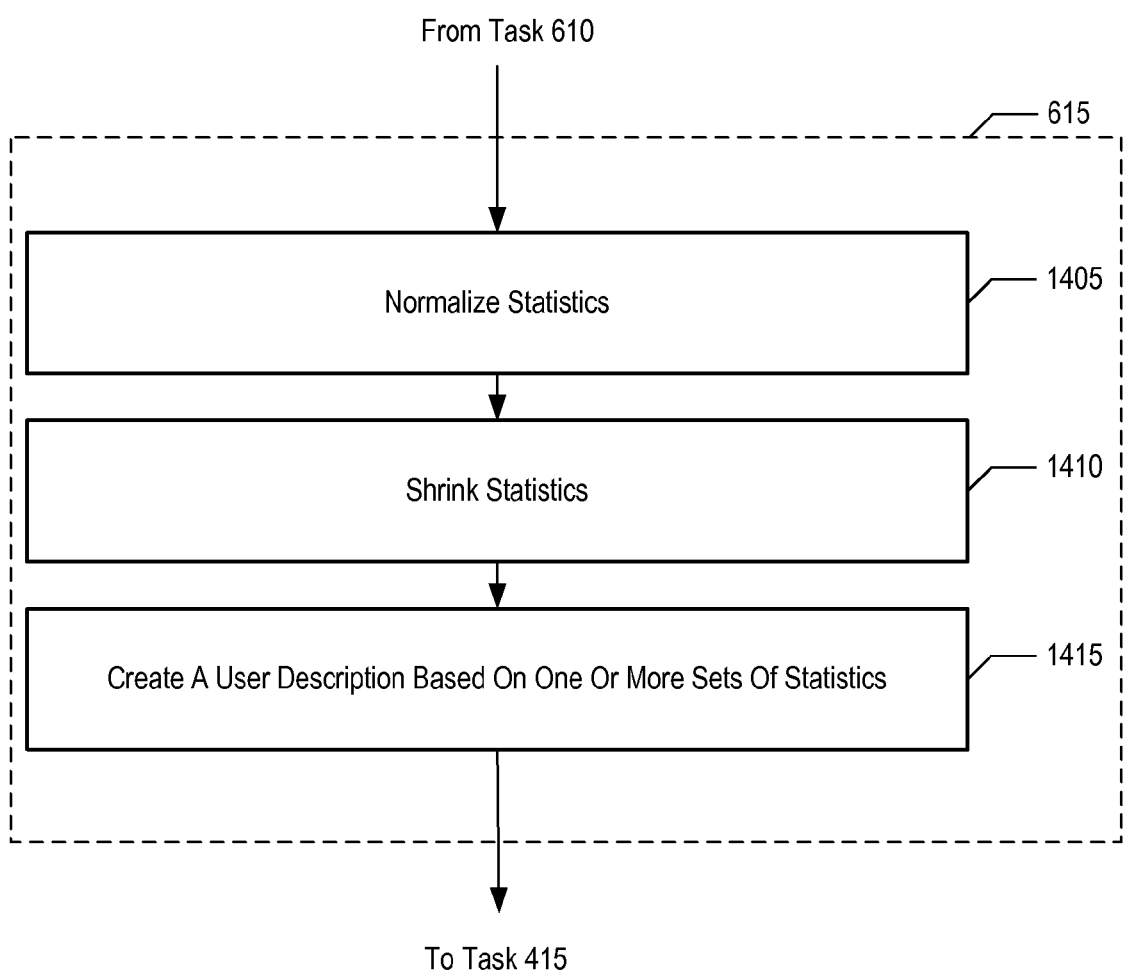
FIG. 14 depicts a flowchart of the salient subtasks of task 615

FIG. 14 depicts a flowchart of the salient subtasks of task 615 for generating a user description estimate, in accordance with an illustrative embodiment of the present invention. As discussed above and with respect to FIG. 6, in some embodiments system 210 uses estimation theory techniques that are different from those described below.

At task 1405, system 210 normalizes the statistics. For example, the normalization allows for the comparison of subscribers with different spatial-temporal (S-T) event counts or observation periods, or both, and enables more accurate comparison across users with different counts of location observations. In accordance with an illustrative embodiment, system 210 normalizes at least some of the statistics by converting event "counts" to "rates" (e.g., occurrences as a function of time, percentage out of total occurrences, etc.). In some alternative embodiments, another technique can be used to normalize the statistics. In still some other embodiments, normalization can be disabled.

At task 1410, system 210 statistically shrinks the normalized statistics. Shrinking, as is known in the art, is performed to address certain users with sparse data, with the effect that users with little information will in effect look like the average user. In accordance with an illustrative embodiment, system 210 performs a weighted average, based on the number of observations for the user, of the user's initial-characteristic value and the overall average-characteristic value. In some alternative embodiments, another technique can be used to shrink the statistics. In still some other embodiments, shrinking can be disabled.

At task 1415, system 210 creates one or more user description estimates from the normalized and shrunk statistics derived from the received data points. In accordance with the illustrative embodiment of the present invention, a user's description comprises one or more of the possibly normalized and/or shrunk evaluation results (e.g., event counts, etc.) described above and with respect to FIGS. 7 through 13, in any combination of said results. In some embodiments, a user description comprises user attributes that are represented as numbers describing behavior of the user. For example and without limitation, a user description can be represented as a collection of counts and other numeric information (e.g., rates, etc.) that describe a user, in which each count or rate, such as the counts or rates described above, represents a different user attribute. Being composed of a collection of counts or rates, in some embodiments, the user description can be represented in a spreadsheet (e.g., in a particular row or column corresponding to a particular user, etc.) or stored in a database. As those who are skilled in the art will appreciate, after reading this specification, other representations of the individual data that compose a user description are possible and other representations of the user description as a whole are possible.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products—that is, one or more modules of computer program instructions encoded on a computer-readable medium for execution by, or to control the operation of, a data-processing system. The computer-readable medium can be a machine-readable storage device, a machine-readable storage substrate, a memory device, or a combination of one or more of them. The term "data-processing system" encompasses all apparatus, devices, and machines for processing data, including by way of example a programmable processor, a computer, or multiple processors or computers. The data-processing system can include, in addition to hardware, code that creates an execution environment for the computer program in question, such as code that constitutes processor firmware, a protocol stack, a database management system, an operating system, or a combination of one or more of them.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   receiving, by a data-processing system, a plurality of data points D that correspond to a first user, wherein each data point in the plurality of data points D represents a visit by the first user, the visit occurring at one or both of i) a determinable geolocation and ii) a determinable time, and wherein the plurality of data points comprises at least a first data point that occurs at a first time $t_1$, $d(t_1)$;
   determining, by the data-processing system, an entropy of the plurality of data points D, based on a number of predetermined places to which the data points in the plurality of data points D correspond; and
   estimating, by the data-processing system, a description of the first user, wherein the description is based on the determined entropy.

2. The method of claim 1 wherein the plurality of data points D further comprises a second data point that occurs at a second time $t_2$, $d(t_2)$, and wherein the determined entropy depends on whether the first data point $d(t_1)$ and the second data point $d(t_2)$ correspond to different places or the same place visited by the first user.

3. The method of claim 1 further comprising determining, by the data-processing system, a number of different places visited by the first user.

4. The method of claim 3 further comprising determining, by the data-processing system, a non-empty set of places that can be visited, wherein the number of different places visited by the first user is based on the non-empty set of places that can be visited.

5. The method of claim 4 wherein the determining the non-empty set of places that can be visited is based on applying grid cells to a predetermined geographic area.

6. The method of claim 5 further comprising determining a dimension of each of the grid cells, based on a predetermined characteristic of the first user.

7. The method of claim 6 wherein the predetermined characteristic of the first user is related to distance traveled.

8. The method of claim 1 further comprising partitioning, by the data-processing system, the plurality of data points D into N groups, wherein N is an integer greater than one, and wherein each group of the N groups corresponds to a different place visited by the first user.

9. The method of claim 1 wherein the determined entropy of the plurality of data points D corresponds to a predetermined daypart.

10. The method of claim 9 wherein the first data point $d(t_1)$ occurs during the predetermined daypart, and wherein the plurality of data points D further comprises a second data point that occurs at a second time $t_2$, $d(t_2)$, and wherein the determined entropy depends on whether the second data point $d(t_2)$ occurs during a different daypart or the predetermined daypart.

11. A method comprising:
    receiving, by a data-processing system, a plurality of data points D that correspond to a first user, wherein each of the data point in the plurality of data points D represents a visit by the first user, the visit occurring at one or both of i) a determinable geolocation and ii) a determinable time, and wherein the plurality of data points D comprises at least a first data point that occurs at a first time $t_1$, $d(t_1)$;
    determining, by the data-processing system, an entropy of the plurality of data points D, based on a number of predetermined places to which the data points in the plurality of data points D correspond; and
    transmitting, by the data-processing system, a signal indicating an action to be performed, wherein the action to be performed is based on the determined entropy.

12. The method of claim 11 wherein the determined entropy of the plurality of data points D corresponds to a predetermined first daypart, and wherein the action to be performed is based on the determined entropy for the predetermined first daypart.

13. The method of claim 12 wherein the first data point $d(t_1)$ occurs during the predetermined first daypart, and wherein the plurality of data points D further comprises a second data point that occurs at a second time $t_2$, $d(t_2)$, and wherein the determined entropy depends on whether the second data point $d(t_2)$ occurs during a different daypart or the predetermined first daypart.

14. The method of claim 12 further comprising determining, by the data-processing system, an entropy of the plurality of data points D for a predetermined second daypart, wherein the action to be performed is based on both i) the determined entropy for the predetermined first daypart and ii) the determined entropy for the predetermined second daypart.

15. The method of claim 11 further comprising identifying, by the data-processing system, a first user segment that is based on the determined entropy.

16. The method of claim 15 wherein the action to be performed comprises associating one or more users with the identified first user segment.

17. A method comprising:
receiving, by a data-processing system, a plurality of data points D that correspond to a first user, wherein each data point in the plurality of data points D represents a visit by the first user, the visit occurring at one or both of i) a determinable geolocation and ii) a determinable time, and wherein the plurality of data points comprises at least a first data point that occurs at a first time $t_1$, $d(t_1)$;
determining, by the data-processing system, a first entropy of the plurality of data points D, based on a number of places to which the data points in the plurality of data points D correspond in relation to a predetermined first non-empty set of places that can be visited;
determining, by the data-processing system, a second entropy of the plurality of data points D, based on a number of different places to which the data points in the plurality of data points D correspond in relation to a predetermined second non-empty set of places that can be visited, wherein the places in the predetermined first non-empty set of places and the places in the predetermined second non-empty set of places are of different geographic size; and
transmitting, by the data-processing system, a signal indicating an action to be performed, wherein the action to be performed is based on one or both of i) the determined first entropy and ii) the determined second entropy.

18. The method of claim 17 wherein the action to be performed is based on both i) the determined first entropy and ii) the determined second entropy.

19. The method of claim 17 further comprising determining, by the data-processing system, a first set of places that can be visited, the first set of places to correspond to the predetermined first non-empty set of places.

20. The method of claim 19 wherein the determining the first set of places that can be visited is based on applying grid cells to a predetermined geographic area.

* * * * *